(12) United States Patent
Fukui

(10) Patent No.: US 6,668,722 B2
(45) Date of Patent: Dec. 30, 2003

(54) SHEET MEMBER HOLDING APPARATUS

(75) Inventor: Takashi Fukui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 61 days.

(21) Appl. No.: 10/066,556

(22) Filed: Feb. 6, 2002

(65) Prior Publication Data
US 2002/0148372 A1 Oct. 17, 2002

(30) Foreign Application Priority Data

Feb. 7, 2001 (JP) ........................................ 2001-031395
Mar. 12, 2001 (JP) ........................................ 2001-069386

(51) Int. Cl.$^7$ ................................................. B41F 27/12
(52) U.S. Cl. ................... 101/415.1; 101/378; 101/409; 271/277
(58) Field of Search ................................ 101/378, 409, 101/415.1, 477; 271/82, 277; 355/75, 85, 110

(56) References Cited

U.S. PATENT DOCUMENTS

| 4,250,810 A | 2/1981 | Fowler et al. |
| 4,660,825 A | 4/1987 | Umezawa |
| 6,003,442 A | * 12/1999 | Solomon et al. .......... 101/415.1 |

FOREIGN PATENT DOCUMENTS

| EP | 0 881 074 A2 | 12/1998 |
| JP | 2000-112142 | 4/2000 |

\* cited by examiner

Primary Examiner—Leslie J. Evanisko
(74) Attorney, Agent, or Firm—Sughrue Mion, PLLC

(57) ABSTRACT

A sheet member holding apparatus which holds a winding direction end portion of a sheet member that is wound around a rotary body. Centrifugal force generated by rotation of the rotary body is efficiently utilized to hold the end portion securely and prevent looseness or the like of the sheet member, because the holding apparatus is designed such that the expression $\{(\mu_1+\mu_2)\times(L_2/L_1)\times m\}>c\times r\times t$ is satisfied. $L_1$ is distance from a fulcrum to a clamp section, $L_2$ is distance from the fulcrum to a center of gravity, m is mass of a plate of the apparatus per unit length in the rotary body's axial direction, t is thickness and c is density of the sheet member, and $\mu_1$ and $\mu_2$ are coefficients of friction between the sheet member and, respectively, the clamp section and the rotary body.

7 Claims, 15 Drawing Sheets

SHEET MEMBER HOLDING APPARATUS

BACKGROUND OF THE INVENTION

1. Field of the Invention

The present invention relates to a sheet member holding apparatus wherein a pair of arms, which extend in opposite peripheral directions from a fulcrum attached to a part of a peripheral surface of a rotary body, are pivoted about the fulcrum by a centrifugal force generated by rotation of the rotary body, one of the arms approaches the peripheral surface of the rotary body, and a sheet member wound around the peripheral surface of the rotary body is held by a clamp section attached to the one of the arms.

2. Description of the Related Art

For printing, a photosensitive printing plate (hereinafter, "printing plate"), in which a photosensitive layer is formed on a sheet-type supporting body such as a thin plate made of aluminum, is generally used. As such printing plates, printing plates having different longitudinal and breadthwise dimensions according to printing size are used.

An image exposure apparatus for performing image exposure on a printing plate includes an apparatus which winds a printing plate around a rotary drum and then emits a light beam based on image data to the printing plate while rotating the printing plate integrally with the rotary drum, so as to scan-expose the printing plate.

When the printing plate is wound around the rotary drum, the printing plate is nipped and fixed to the rotary drum by holding apparatuses (chucks) for clamping both ends, in the peripheral direction of the rotary drum, of the printing plate (nipping the plate between the chucks and the peripheral surface of the rotary drum).

That is, a holding apparatus corresponding to one end of the printing plate along the drum peripheral direction (for example, the end at a winding front end side) is attached to a predetermined position of the rotary drum, and, after the printing plate has been wound around the rotary drum, a holding apparatus corresponding to the other end of the printing plate (here, the end at a winding rear end) is attached to a position according to the size of the printing plate.

Here, the holding apparatus for attaching the printing plate to the rotary drum at the position according to the size has a fixing barrel (stanchion) which can be inserted into an arbitrary position of an attachment groove which is formed along the peripheral direction in the peripheral surface of the rotary drum. The fixing barrel attached to the holding apparatus is freely movable relative to the attachment groove and can nip the ends of printing plates having various sizes in suitable positions.

When the printing plate wound around the rotary drum is to be exposed, the printing plate is closely contacted with the peripheral surface of the rotary drum and rotated at high speed together with the rotary drum.

At this time, in order to prevent lifting of the end of the printing plate fixed by the clamp section of the holding apparatus due to centrifugal force, a structure in which the centrifugal force is utilized to instead increase holding force of the clamp section has been suggested (for example, see Japanese Patent Application Laid-Open No. 2000-112142).

In this publication (of the prior art), because force is applied by the centrifugal force to portions to be held, a ratio of lengths from a fulcrum to the ends of a seesaw-type arm (a mechanism where a center portion is the fulcrum and the arm pivots about the fulcrum) is prescribed, and a strong holding force is applied at a distal end of the arm at a clamp section side thereof. In this prior art, a combined structure in which the sheet material is adsorbed to the rotary drum when wound around the rotary drum is also used.

However, in the above prior art, holding of the sheet material is mainly due to the adsorption, and holding reinforcement due to the centrifugal force is utilized supplementarily. Moreover, the publication discloses only prescription of the lengths of the arms and simply describes the well-known law of moment. Therefore, a position of the center of gravity in the holding apparatus, a coefficient of friction between the holding apparatus and the sheet material at the time of holding the sheet material, a coefficient of friction between the sheet material and the rotary drum, and the like are not taken into consideration.

However, in a case where the sheet material is not adsorbed to the rotary drum, the above coefficients of friction and the like can be important conditions, and the centrifugal force cannot be utilized effectively merely by prescribing the lengths of the arms.

SUMMARY OF THE INVENTION

It is an object of the present invention to provide an apparatus which utilizes centrifugal force effectively so as to be capable of holding a sheet member securely.

There will now be explained a first principle with reference to a model shown in FIGS. 1A and 1B.

FIG. 1A shows a state in which a sheet member 202 is wound around a peripheral surface of a rotary body 200. A radius of the rotary body 200 is r, a thicknesswise dimension of the sheet member 202 is t, and density of material of the sheet member 202 is c.

A holding apparatus 204 of the present invention is provided at an end of the sheet member 202, and a pair of arms 208 and 210 are provided extending from a fulcrum 206 in opposite directions along a peripheral direction of the rotary body 200. A first of the arms 208 (left of the fulcrum 206 in FIG. 1A) is pivoted on the fulcrum 206 by centrifugal force generated at a time of rotation of the rotary body 200 so as to approach the peripheral surface of the rotary drum 200, and the sheet member 202 is consequently pressed by a clamp section 212. As a result, the sheet member 202 is nipped and held between the peripheral surface of the rotary body 200 and the clamp section 212.

There is a coefficient of friction $\mu_1$ between the clamp section 212 and the sheet member 202, and a coefficient of friction $\mu_2$ between the sheet member 202 and the rotary body 200.

FIG. 1B is an enlarged diagram of the holding apparatus 204 of the present invention.

Length of the first arm 208 (from the fulcrum 206 to the clamp section 212) is $L_1$, length of the second arm 210 (from the fulcrum 206 to a center of gravity 214) is $L_2$, and a unit weight of the center of gravity (weight per unit length of the arm in an axial direction of the rotary body) is m.

Here, when the rotary body 200 rotates, a centrifugal force $m \times r \times \omega^2$ is applied at the center of gravity 214 in an upward direction of FIG. 1B. Here, $\omega$ is angular velocity.

This centrifugal force effects a holding force at the clamp section 212 of the first arm 208 to the sheet member 202, and when a ratio of the lengths of the first arm 208 and the second arm 210 is taken into consideration, theoretically, the sheet member 202 is nipped by a force of $(L_2/L_1) \times m \times r \times \omega^2$.

Further, because the coefficients of friction $\mu_1$ and $\mu_2$ are effective at the clamp section 212, when the coefficients of friction $\mu_1$ and $\mu_2$ are combined, the holding force of the clamp section 212 generated by the rotation of the rotary body 200 can be represented by the following expression.

$$(\mu_1+\mu_2)\times(L_2/L_1)\times m\times r\times\omega^2$$

On the other hand, as a force which acts at the sheet member 202 during the rotation of the rotary body 200, a force due to the centrifugal force and acting to pull the sheet member out of the clamp section 212 may be considered. This force can be represented by the density c and thicknesswise dimension t of the sheet member 202, and the radius r and angular velocity $\omega$ of the rotary body 200 in the following expression.

$$c\times r^2\times t\times\omega^2$$

In order to hold the sheet member 202 securely by the clamp section 212, the following relationship must hold:

$$(\mu_1+\mu_2)\times(L_2/L_1)\times m\times r\times\omega^2 > c\times r^2\times t\times\omega^2$$

When common denominators (r and $\omega^2$) are removed, the following relationship holds.

$$\{(\mu_1+\mu_2)\times(L_2/L_1)\times m\} > c\times r\times t$$

Conversely, the coefficients of friction $\mu_1$ and $\mu_2$ the length $L_1$ of the first arm 208 (from the fulcrum 206 to the clamp section 212), the length $L_2$ of the second arm 210 (from the fulcrum 206 to the center of weight 214), the unit weight m of the center of gravity 214 (weight of the arm per unit length in the axial direction of the rotary body), the density c and thicknesswise dimension t of the sheet member 202, and the radius r of the rotary body 200 can be set suitably such that an ideal holding apparatus for utilizing the centrifugal force can be structured.

Next, there will now be explained a second principle of the present invention with reference to a model shown in FIGS. 2A and 2B. The same reference numerals are given to elements which are substantially the same as those in FIGS. 1A and 1B, and overlapping explanations are suitably omitted.

FIG. 2A shows a state in which the sheet member 202 is wound around the peripheral surface of the rotary body 200. The radius of the rotary body 200 is r, the thicknesswise dimension t of the sheet member 202 is t, and the density of material of the sheet member 202 is c.

The holding apparatus 204 of the present invention is provided at an end of the sheet member 202, and the pair of arms 208 and 210 are provided extending from the fulcrum 206 in opposite directions of the peripheral direction of the rotary body 200. The first arm 208 (left of the fulcrum 206 in FIG. 2A) is pivoted about the fulcrum 206 by the centrifugal force generated at the time of the rotation of the rotary body 200 so as to approach the peripheral surface of the rotary drum 200, and the sheet member 202 is pressed by the clamp section 212. As a result, the sheet member 202 is nipped to be held by the peripheral surface of the rotary body 200 and the clamp section 212.

There is a coefficient of maximum rest friction $\mu_1$ between the clamp section 212 and the sheet member 202, and a coefficient of maximum rest friction $\mu_2$ between the sheet member 202 and the rotary body 200.

FIG. 2B is an enlarged diagram of the holding apparatus 204 of the present invention.

The length of the first arm 208 (from the fulcrum 206 to the clamp section 212) is $L_1$ the length of the second arm 210 (from the fulcrum 206 to a center of gravity 214) is $L_2$, and the unit weight of the center of gravity 214 (weight of the arm per unit length in an axial direction of the rotary body) is m. A distance from the center of the rotary body 200 to the center of gravity 214 is $\alpha r$.

Here, when the rotary body 200 rotates, a centrifugal force $m\times\alpha\times r\times\omega^2$ is applied at the center of gravity 214 in an upward direction of FIG. 2B.

The centrifugal force effects the holding force at the clamp section 212 of the first arm 208 to the sheet member 202, and when the ratio of the lengths of the first arm 208 and the second arm 210 is taken into consideration, theoretically, the sheet member 202 is nipped by a force of $(L_2/L_1)\times m\times\alpha\times r\times\omega^2$. Moreover, an additional pressure force $T_0$ may be applied as a nipping force in a ratio $L_3/L_1$, where $L_3$ is a distance from the fulcrum 206 to a point of application of the pressure force $T_0$. Thus, a value obtained by adding the centrifugal force and the pressure force becomes an overall holding force $((L_2/L_1)\times m\times\alpha\times r\times\omega^2+(L_3/L_1))$.

Here, if the sheet member 202 is drawn in a stretching direction by the clamp section 212, a condition such that, due to friction between the clamp section 212 and the sheet member 202, sliding does not occur is required. Therefore, if a coefficient of maximum rest friction is $\mu_1$, and a tensioning force from the clamp section 212 generated by the rotation of the rotary body 200 is F, the following expression should hold.

$$\mu_1[(L_2/L_1)m\alpha r\omega^2+(L_3/L_1)T_0] > F$$

A similar holding force is applied between the sheet member 202 and the rotary body 200. At this time, the tensioning force F pulling the sheet member should be larger than a value obtained by multiplying this holding force by the friction coefficient $\mu_2$ between the sheet member 202 and the rotary body 200. Namely, the following expression should hold.

$$F > cr^2t\omega^2+\mu_2[(L_2/L_1)m\alpha r\omega^2+(L_3/L_1)T_0]$$

The above two expressions are combined as follows.

$$\mu_1[(L_2/L_1)m\alpha r\omega^2+(L_3/L_1)T_0] > F > cr^2t\omega^2+\mu_2[(L_2/L_1)m\alpha r\omega^2+(L_3/L_1)T_0]$$

The coefficients of maximum rest friction $\mu_1$ and $\mu_2$, the length $L_1$ of the first arm 208 (from the fulcrum 206 to the clamp section 212), the length $L_2$ of the second arm 210 (from the fulcrum 206 to the center of gravity 214), the unit weight m of the center of gravity 214 (weight of the arm per unit length in the axial direction of the rotary body), the distance from the center of the rotary body to the center of gravity $\alpha r$, the pressure force $T_0$ applied to the sheet member 202 in the pressing direction by the clamp section 212 when the rotary body 200 is still, the distance $L_3$ from the fulcrum to the position to which the pressure force $T_0$ is applied, the density c and the thicknesswise dimension t of the sheet member 200, and the radius r of the rotary body 200 can be set such that the above relational expression is satisfied. As a result, the sheet member can be fixed securely. Namely, the sheet member can be put into a stretched state (lift prevention state) by an ideal tensioning force utilizing the centrifugal force.

In the above relational expression, the tensioning force F is a force stretching the sheet member in a stretching direction due to the centrifugal force. If the tensioning force F is $kr\omega^2$ (k is a coefficient relating to mass) and the pressure force $T_0$ is 0, the following expression can be obtained:

$$\mu_1(L_2/L_1)m\alpha > k > crt+\mu_2(L_2/L_1)m\alpha$$

Position, weight and the like of the members in the assembled holding apparatus, rotary body and the like relating to the coefficient k can be set such that the above expression is satisfied. The pressure force $T_0$ may be a weak force such that the sheet member is not allowed to move by the holding apparatus. Accordingly, a degree of freedom of design can be increased.

BRIEF DESCRIPTION OF THE DRAWINGS

FIG. 1A is a diagram showing a positional relationship between a rotary body and a holding apparatus, and FIG. 1B is an enlarged diagram showing a portion surrounded by a broken line in FIG. 1A.

FIG. 2A is a diagram showing a positional relationship between a rotary body and a chuck, and FIG. 2B is an enlarged diagram showing a portion surrounded by a broken line in FIG. 2A.

DETAILED DESCRIPTION OF PREFERRED EMBODIMENTS

Figure 1A:
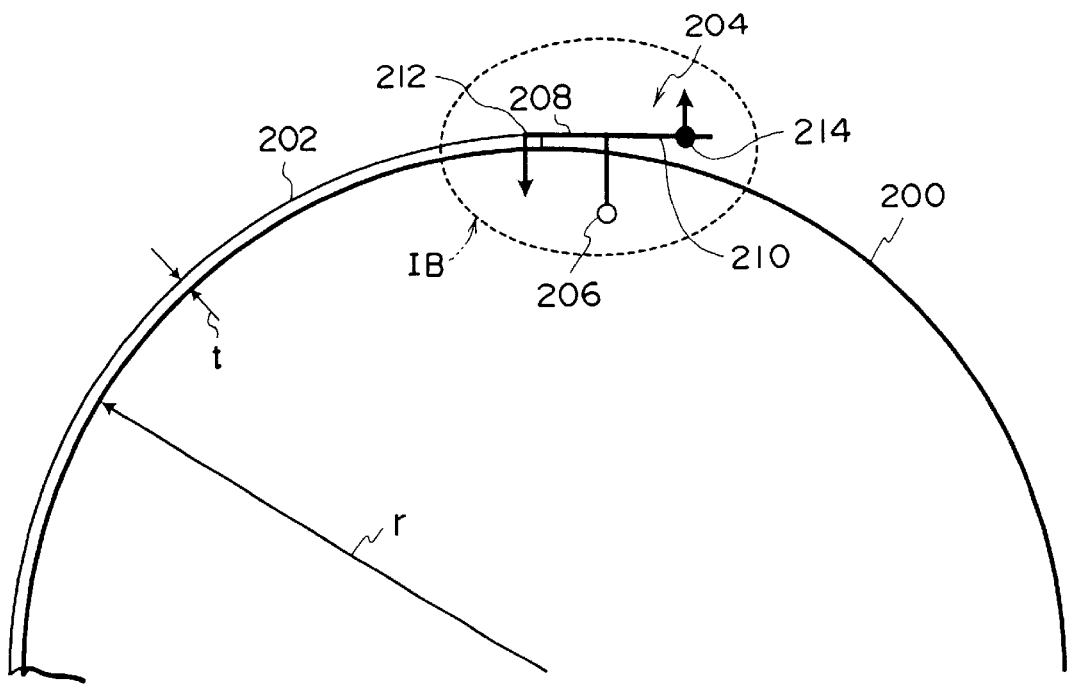
FIGS. 1A and 1B are diagrams for explaining a first principle of the present invention.
Figure 1B:
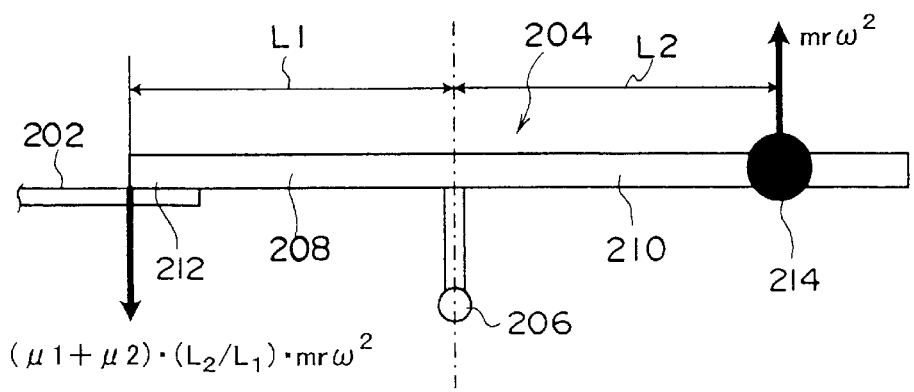
Figure 2A:
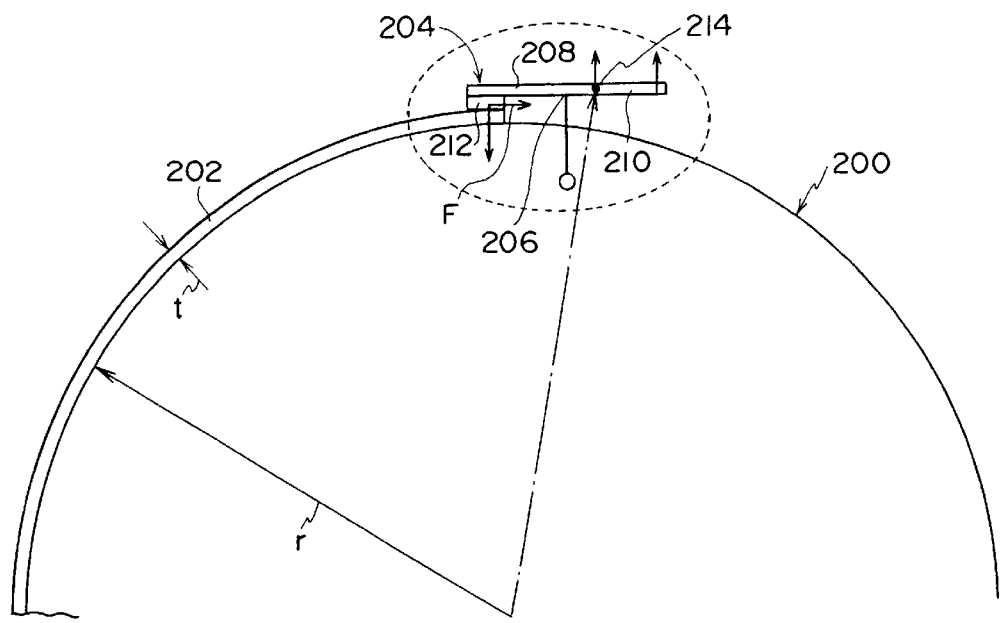
FIGS. 2A and 2B are diagrams for explaining a second principle of the present invention.
Figure 2B:
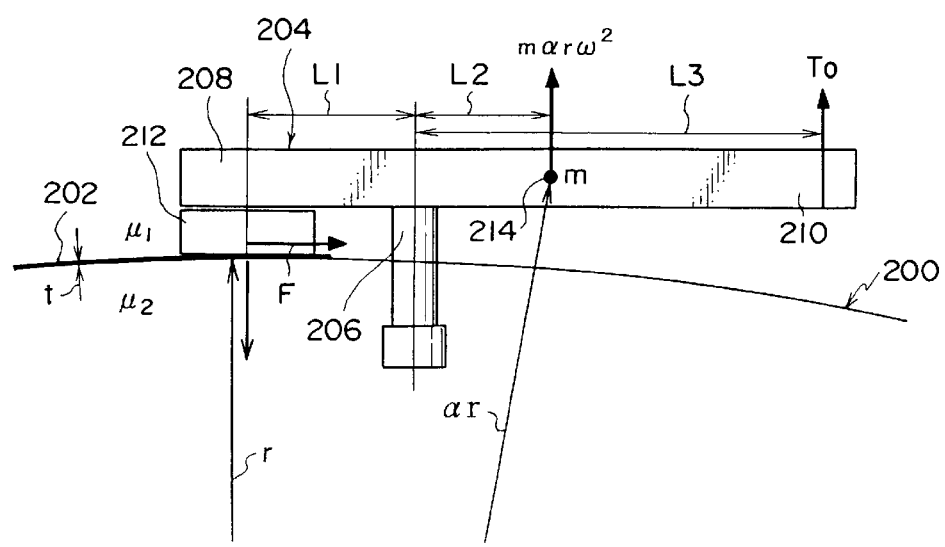
Figure 3:
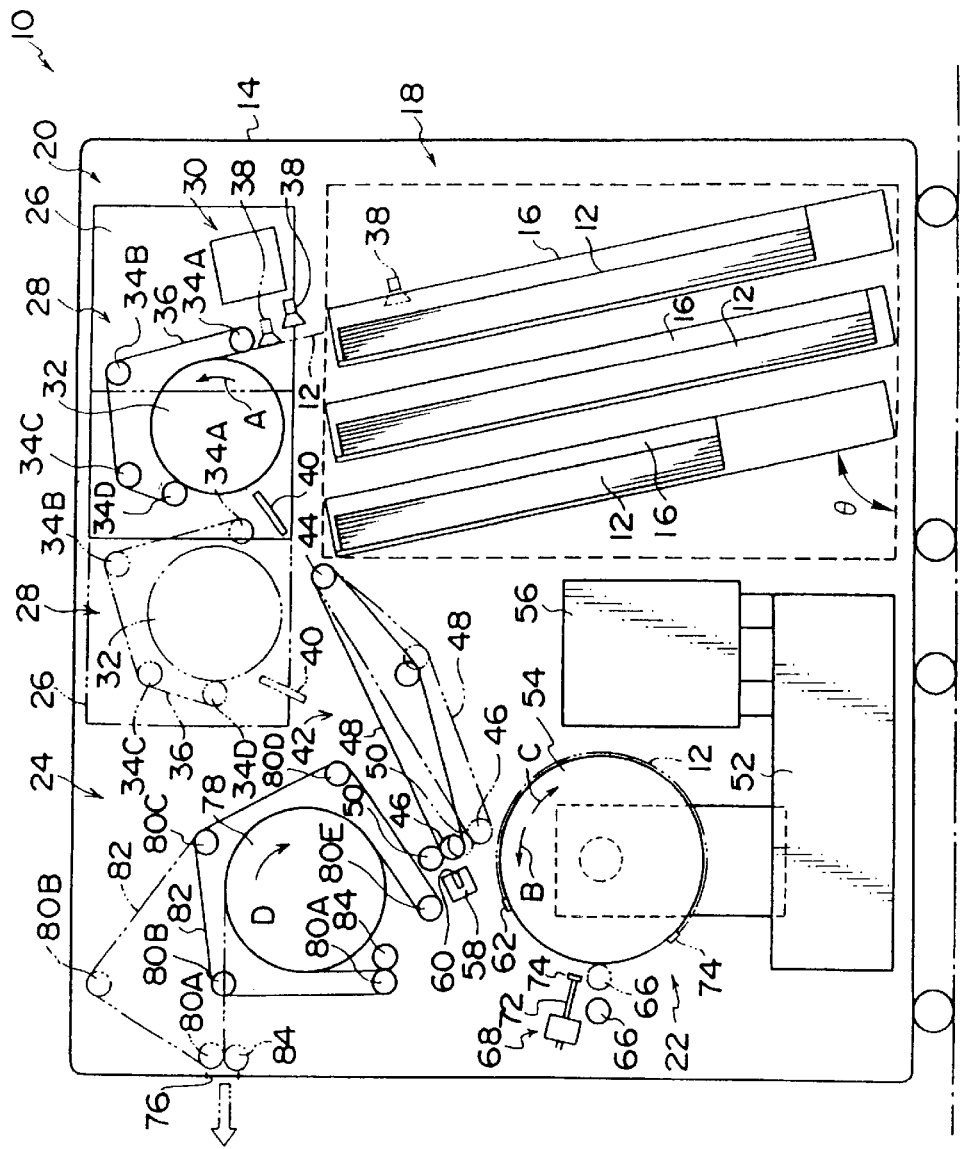
FIG. 3 is an overall schematic structural diagram showing an image exposure apparatus according to a first embodiment of the present invention.

There will now be explained a first embodiment of the present invention with reference to the diagrams. FIG. 3 shows schematic structure of an image exposure apparatus 10 according to the present embodiment. The image exposure apparatus 10 uses a photosensitive planographic printing plate (hereinafter "printing plate 12") in which a photosensitive layer is formed on a sheet member, for example, a rectangular, thin plate-type supporting body made of aluminum or the like (e.g., thicknesswise dimension t is $0.3 \times 10^{-3}$ m and density c is $2.7 \times 10^3$ kg/m$^3$). The printing plate 12 is irradiated with a light beam which is modulated based on image data and scanned and exposed. The printing plate 12 for which image exposure has been completed in the image exposure apparatus 10 is then subjected to a developing process or the like by an automatic developing apparatus or the like, which is not shown.

The image exposure apparatus 10 is provided with a cassette loading section 18, a plate-feed conveying section 20, a recording section 22, a discharge buffer section 24 and the like, in a machine frame 14. The cassette loading section 18 is provided at a lower right side in FIG. 3 of the machine frame 14, and a plurality of cassettes 16 which each house a plurality of printing plates 12 are loaded into the cassette loading section 18 such that the cassettes 16 are slanted at a predetermined angle.

In the image exposure apparatus 10, the printing plates 12, having plural sizes and different longitudinal and breadthwise dimensions, can be processed. The printing plates 12 having a certain size are housed in one of the cassettes 16 with photosensitive layers face upward and one ends located at a predetermined position. A plurality of the cassettes 16 are loaded into the cassette loading section 18 with a predetermined interval such that the one ends of the printing plates 12 housed therein come to an approximately constant height.

The plate-feed conveying section 20 is provided above the cassette loading section 18, and the recording section 22 is provided to a lower center portion of the apparatus, adjacent to the cassette loading section 18. A pair of side plates 26 (only one is shown in FIG. 3) are provided to the plate-feed conveying section 20 and an inversion unit 28 and a sheet unit 30 are attached to the side plates 26.

The inversion unit 28 has an inversion roller 32 having a predetermined outer diameter, and a plurality of small rollers (in this embodiment, for example, four small rollers 34A, 34B, 34C and 34D) are provided around the inversion roller 32. The small rollers 34A through 34D are provided from a cassette loading section 18 side to a recording section 22 side via a portion above the inversion roller 32, and an endless conveying belt 36 is wound around them. Accordingly, between the small roller 34A and the small roller 34D, the conveying belt 36 is wound around about half the periphery of the inversion roller 32.

The sheet unit 30 has a plurality of suction pads 38 for sucking an upper end of the printing plate 12 in the cassette 16. The sheet unit 30 moves the suction pads 38 downward so that the suction pads 38 face the upper end of the printing plate 12 in the cassette 16 and suck the printing plate 12. Then, the sheet unit 30 moves the suction pads 38 sucking the printing plate 12 approximately upward so as to take the printing plate 12 out of the cassette 16, and inserts the front end of the pulled printing plate 12 between the inversion roller 32 and the conveying belt 36. Here, in FIG. 3, outlines of the moving positions of the suction pads 38 are shown by broken lines.

In the inversion unit 28, the inversion roller 32 and the conveying belt 36 rotate in a direction in which the printing plate 12 is pulled out from the cassette 16 (direction of an arrow A in FIG. 3). As a result, the printing plate 12 is nipped between the inversion roller 32 and the conveying belt 36, pulled out of the cassette 16, and wound around the peripheral surface of the inversion roller 32 so as to be curved, conveyed and inverted. A radius of the inversion roller 32 has a dimension such that when the printing plate 12 is curved the printing plate 12 is not creased nor skewed (for example, not less than 100 mm).

As shown by solid lines and broken lines in FIG. 3, the side plate 26 moves horizontally according to a position of the cassette 16 from which the printing plate 12 is taken out. As a result, the suction pads 38 of the sheet unit 30 face the printing plates 12 in the selected cassette 16.

Further, the side plate 26 is provided with a guide 40 below the small roller 34D. The printing plate 12 which has been inverted by the inversion roller 32 is sent from between the inversion roller 32 and the conveying belt 36 towards this guide 40 at the small roller 34D side. Moreover, a transport conveyor 42 is provided above the recording section 22. The printing plate 12 sent out from the inversion unit 28 is guided to the transport conveyor 42 by the guide 40.

The guide 40 always tilts in accordance with movement of the side plate 26 such that a guiding direction of the printing plate 12 is towards the transport conveyor 42. Also, the small roller 34D at the recording section 22 side moves so that a sending direction of the printing plate 12 from the inversion unit 28 changes in accordance with the movement of the side plate 26. The small roller 34C also moves, such that, when the small roller 34D moves, approximately constant tension is applied to the conveying belt 36. As a result, the printing plate 12 sent out from the inversion unit 28 is curved gently by the guide 40.

At the transport conveyor 42, a conveying belt 48 is wound around a roller 44 adjacent to and below the plate-feed conveying section 20 and a roller 46 adjacent to and above the recording section 22. The transport conveyor 42 is slanted with the roller 46 side downward.

Figure 4:
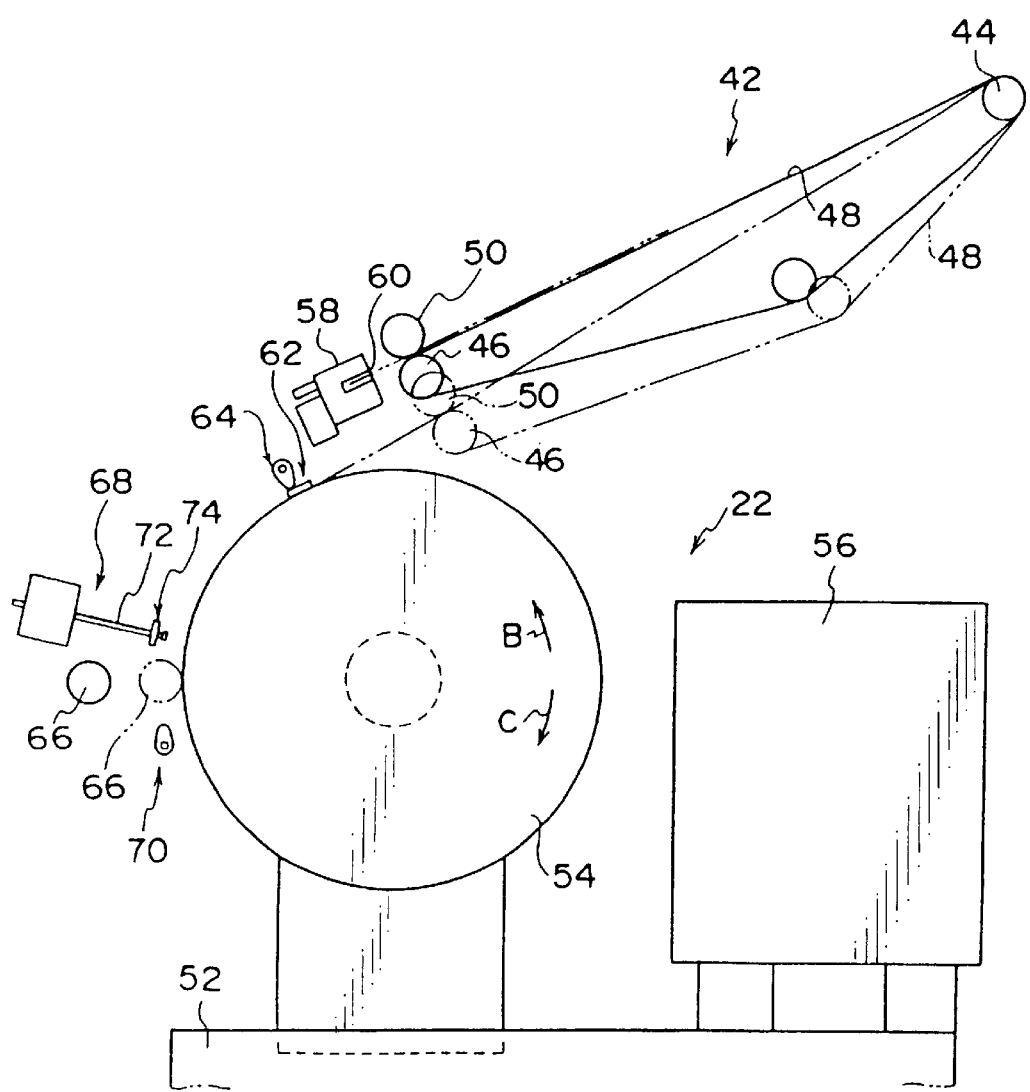
FIG. 4 is a schematic structural diagram showing a recording section according to the first embodiment.

As shown in FIGS. 3 and 4, the transport conveyor 42 is provided with a roller 50 which faces the roller 46, and the printing plate 12 sent onto the transport conveyor 42 is conveyed along the conveying belt 48 and nipped between the rollers 46 and 50. In the recording section 22, a rotary drum 54 and a recording head section 56 are mounted on a trestle 52. A puncher 58 is provided above the rotary drum 54. A radius r of the rotary drum 54 is 0.165 m.

As shown in FIG. 4, the puncher 58 is formed with a notching opening 60. The transport conveyor 42 nips the printing plate 12 by means of the rollers 46 and 50, inserts the front end of the printing plate 12 into the notching opening 60 of the puncher 58, and holds the printing plate 12. When the front end of the printing plate 12 is inserted into the notching opening 60, the puncher 58 forms, for example, a notch for location at a predetermined position of the front end of the printing plate 12.

When the notch has been formed on the printing plate 12, the transport conveyor 42 reversely drives the rollers 46 and 50 and the conveying belt 48 so as to pull out the front end of the printing plate 12 from the notching opening 60 of the puncher 58. The transport conveyor 42 is provided with an unillustrated tilting means, and the roller 46 side is moved downward, with the roller 44 being an axis of tilting, so as to approach the rotary drum 54 of the recording section 22 (as shown by broken lines in FIGS. 3 and 4). Then, the printing plate 12 on the conveying belt 48 is conveyed on the conveying belt 48 to the rotary drum 54 with the front end facing a predetermined position of an outer peripheral surface of the rotary drum 54.

The rotary drum 54 is rotatable by an unillustrated driving means in a direction of attachment/exposure of the printing plate 12 (direction of an arrow B in FIGS. 3 and 4) and in a detachment direction of the printing plate 12 which is opposite to the attachment/exposure direction.

As shown in FIG. 4, a front end chuck 62 is attached to a predetermined position of the outer peripheral surface of the rotary drum 54. In the recording section 22, when the printing plate 12 is to be attached to the rotary drum 54, first the rotary drum 54 stops with the front end chuck 62 at a position facing the front end of the printing plate 12 which is being sent by the transport conveyor 42 (a printing plate attaching position).

The recording section 22 is provided with an attachment cam 64 which opposes the front end chuck 62 at the printing plate attaching position. The attachment cam 64 pivots, and one end of the front end chuck 62 is pressed by the attachment cam 64 such that the printing plate 12 can be inserted between the other end and the peripheral surface of the rotary drum 54. In the recording section 22, in a state in which the front end of the printing plate 12 has been inserted between the front end chuck 62 and the rotary drum 54, when the attachment cam 64 is returned to the original position so as to release pressure on the front end chuck 62, the front end of the printing plate 12 can be nipped and held between the front end chuck 62 and the peripheral surface of the rotary drum 54. At this time, a locating pin, not shown, which protrudes from a predetermined position of the peripheral surface of the rotary drum 54, enters the notch formed by the puncher 58 in the printing plate 12 so that the printing plate 12 is positioned on the rotary drum 54.

In the recording section 22, when the front end of the printing plate 12 has been fixed to the rotary drum 54, the rotary drum 54 is rotated in the attachment/exposure direction. As a result, the printing plate 12 sent from the transport conveyor 42 is wound around the peripheral surface of the rotary drum 54.

A squeeze roller 66 is provided at a downstream side in the attachment/exposure direction from the printing plate attachment position, in a vicinity of the peripheral surface of the rotary drum 54. The squeeze roller 66 moves towards the rotary drum 54 and presses the printing plate 12 wound around the rotary drum 54 towards the rotary drum 54 so as to bring the printing plate 12 into close contact with the peripheral surface of the rotary drum 54.

In addition, a rear end chuck attachment/detachment unit 68 is provided at an upstream side in the attachment/exposure direction in the vicinity of the squeeze roller 66, and a detachment cam 70 is provided at the downstream side in the attachment/exposure direction of the same vicinity. A rear end chuck 74 is attached to a distal end of a shaft 72 which protrudes toward the rotary drum 54 at the rear end chuck attachment/detachment unit 68.

When the rear end of the printing plate 12 wound around the rotary drum 54 faces the rear end chuck attachment/detachment unit 68, the shaft 72 is projected, and the rear end chuck 74 is attached to a predetermined position of the rotary drum 54. As a result, the rear end chuck 74 nips and holds the rear end of the printing plate 12 on the rotary drum 54.

When the front end and the rear end of the printing plate 12 are held to the rotary drum 54, the squeeze roller 66 is separated. Thereafter, in the recording section 22, the rotary drum 54 is rotated at a predetermined high speed, and a light beam modulated on the basis of image data is emitted from the recording head section 56 in synchronization with the rotation of the rotary drum 54. As a result, the printing plate 12 is scanned and exposed based on the image data.

After the scanning and exposure of the printing plate 12 are completed, when the rear end chuck 74 which holds the rear end of the printing plate 12 comes to the position facing the rear end chuck attachment/detachment unit 68, the rotation of the rotary drum 54 is stopped. The squeeze roller 66 moves towards the rotary drum 54 and presses the printing plate 12. The rear end chuck detachment unit 68 receives the rear end chuck 74 and detaches the rear end chuck 74 from the rotary drum 54. As a result, the rear end of the printing plate 12 is completely released.

When the rear end chuck 74 has been detached from the rotary drum 54, the rotary drum 54 is rotated in a direction in which the printing plate 12 is taken out. As a result, the printing plate 12 is conveyed from between the squeeze roller 66 and the rotary drum 54.

As shown in FIG. 3, the discharge buffer section 24 is provided above the squeeze roller 66. The rotary drum 54 is rotated in a detachment direction of the printing plate 12 (direction of an arrow C) so that the printing plate 12 is sent out towards the discharge buffer section 24 with the rear end facing the discharge buffer section 24. The rotary drum 54 is rotated until the front end chuck 62 stops at a printing plate detachment position facing the detachment cam 70. The detachment cam 70 at this position is caused to pivot so as to press the front end chuck 62, and the nipping of the front end of the printing plate 12 between the front end chuck 62 and the rotary drum 54 is released. As a result, the printing plate 12 is detached from the rotary drum 54.

The discharge buffer section 24 has a discharge roller 78 which is provided at an inner side of a discharge opening 76 formed in the machine frame 14. A plurality of small rollers (for example, small rollers 80A, 80B, 80C, 80D and 80E) are provided around the discharge roller 78. An endless conveying belt 82 is wound around the small rollers 80A through 80E. As a result, the conveying belt 82 is wound around between the small roller 80A and the small roller 80E in the range of ½ to ¾ of the whole periphery of the discharge roller 78.

The small roller 80A is projected toward the squeeze roller 66 side of the recording section 22, and a roller 84 is provided facing the small roller 80A. The printing plate 12 sent out of the recording section 22 is guided between the small roller 80A and the roller 84 so as to be nipped between the small roller 80A and the roller 84.

In the discharge buffer section 24, when the discharge roller 78 is rotated in a direction in which the printing plate 12 is pulled in (direction of an arrow D), the printing plate 12 nipped between the small roller 80A and the roller 84 is pulled out from the recording section 22 and simultaneously guided to between the discharge roller 78 and the conveying belt 82 so as to be nipped therebetween and wound around the discharge roller 78. At this time, the front end of the printing plate 12 (the rear end as conveyed out of the recording section 22) is nipped between the small roller 80A and the roller 84 so that the printing plate 12 wound around the discharge roller 78 is temporarily held.

As shown by broken lines in FIG. 3, the small roller 80A and the roller 84 move to a position facing the discharge opening 76. At this time, the small roller 80A and the idle roller 84 are rotated integrally so that the front end of the printing plate 12 faces the discharge opening 76. The small roller 80B above the small roller 80A moves in accordance with the movement of the small roller 80A so as to apply a constant tension to the conveying belt 82.

In the discharge buffer section 24, when the front end of the printing plate 12 faces the discharge opening 76, the discharge roller 78 is rotated in a sending-out direction of the printing plate 12 (opposite direction to the direction of the arrow D) at a rotating speed according to a conveying speed of the printing plate 12 in a processing apparatus arranged adjacent to the discharge opening 76, such as an automatic developing apparatus. As a result, the printing plate 12 is sent out of the discharge opening 76.

As mentioned above, the front end chuck 62 for fixing the front end of the printing plate 12 to the predetermined position on the peripheral surface of the rotary drum 54 is attached to the rotary drum 54 when the printing plate is being wound around the rotary drum 54. The rear end chuck 74 for fixing the rear end of the printing plate 12 is also attached thereto.

Figure 5:
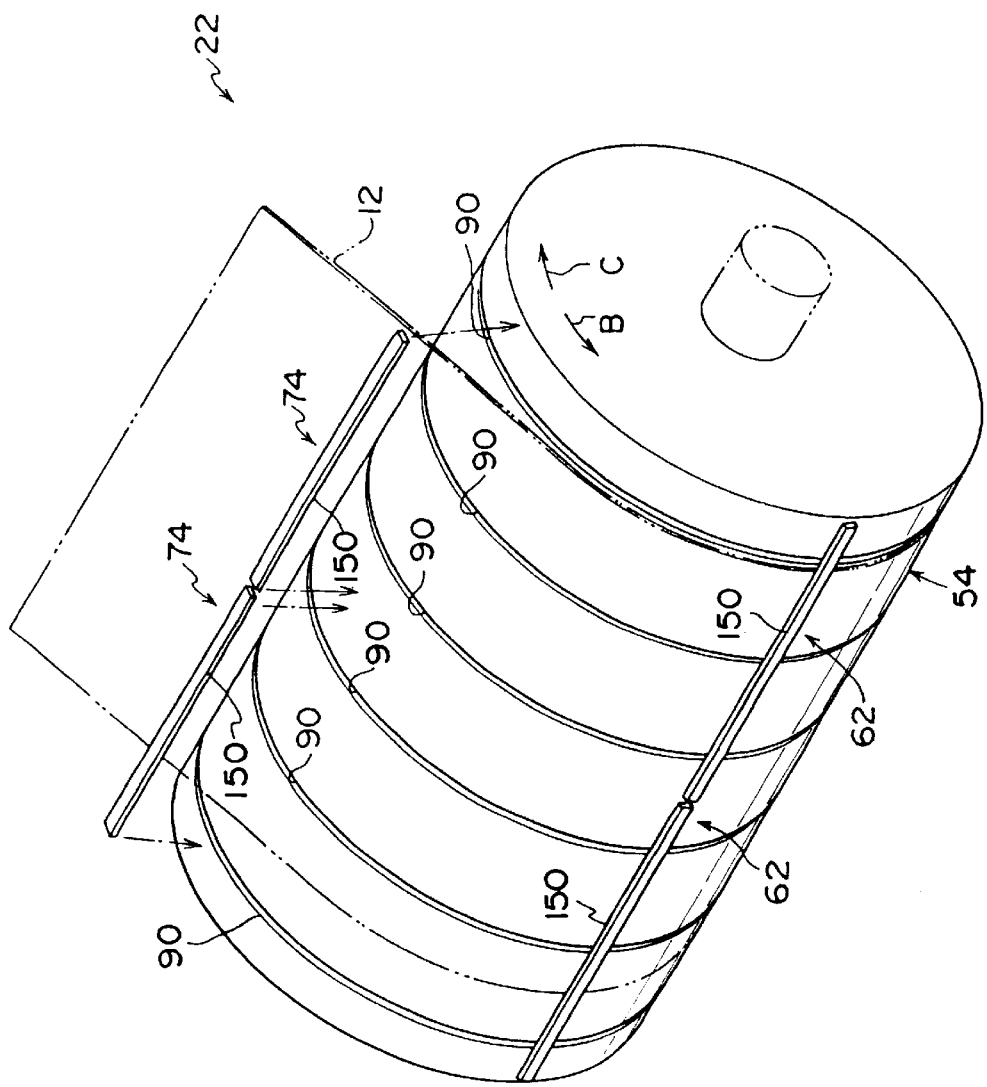
FIG. 5 is a perspective view showing arrangement of a front end chuck and a rear end chuck onto a rotary drum.

As shown in FIG. 5, the front end chuck 62 has plates 150 formed into an elongated plate shape having a predetermined length, and the plates 150 are arranged along an axial direction of the rotary drum 54 at predetermined intervals. The rear end chuck 74 also has the band-shaped plates 150 having the predetermined length, and these plates 150 are also arranged on and attached to the peripheral surface of the rotary drum 54 at predetermined intervals.

The front end chuck 62 and the rear end chuck 74 have approximately the same structure, but directions of their plates 150 are different from each other. In this embodiment, the front end chuck 62 is always attached to the rotary drum 54, and the rear end chuck 74 is detached from the rotary drum 54.

Figure 6:
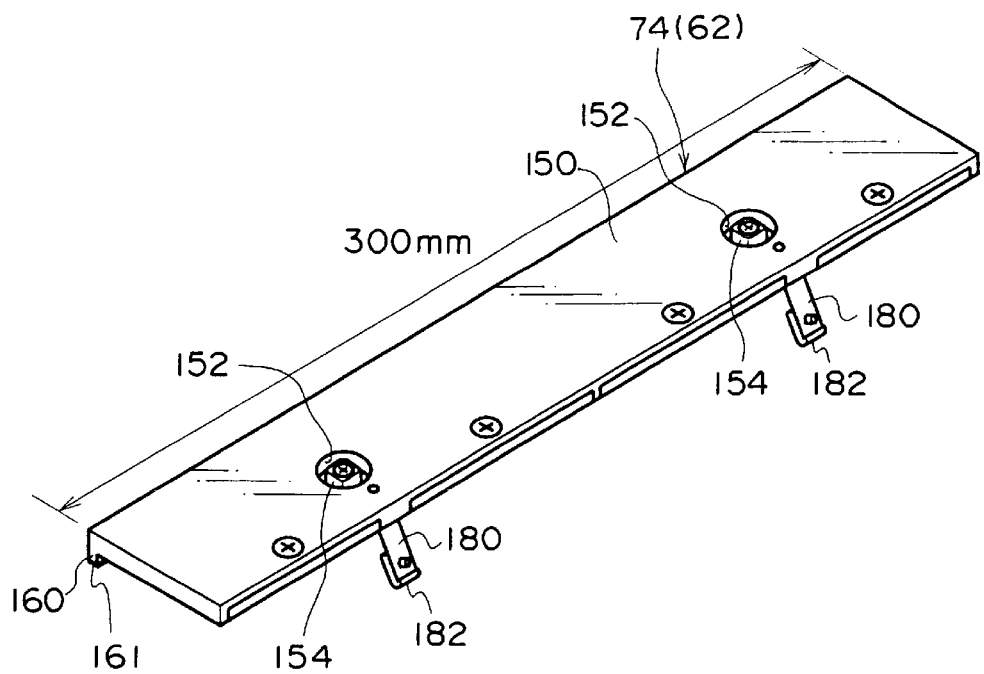
FIG. 6 is a perspective view showing a chuck according to the first embodiment viewed from a front surface side.
Figure 7:
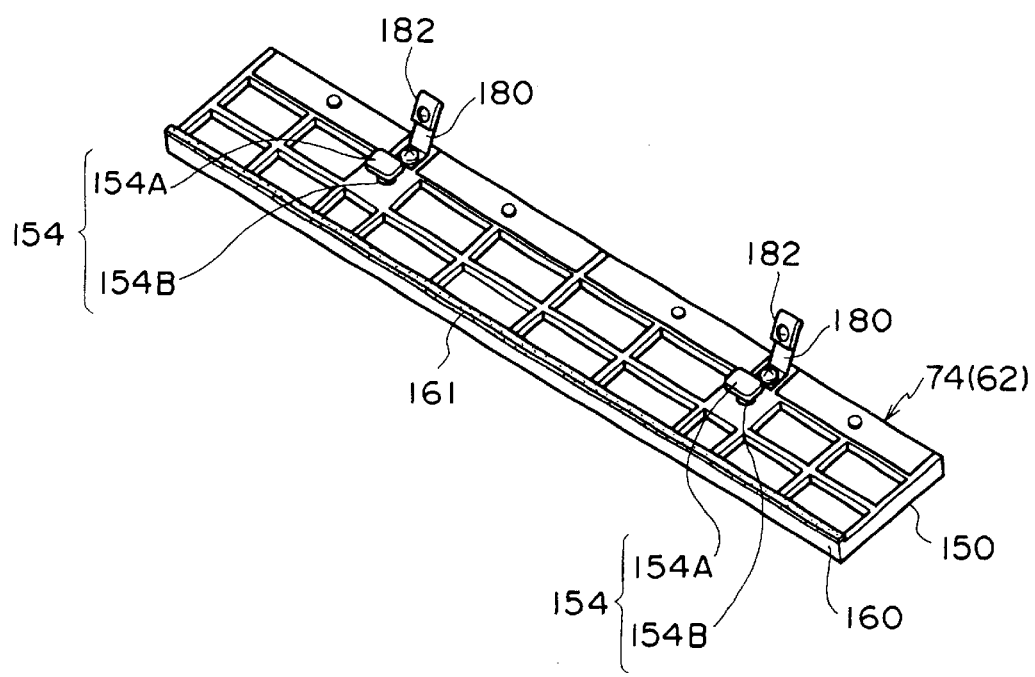
FIG. 7 is a perspective view showing the chuck according to the first embodiment viewed from a rear surface side.

There will now be explained the structures of the front end chuck 62 and the rear end chuck 74 with reference to FIGS. 6 through 8.

The plate 150 of the rear end chuck 74 is formed with through holes 152 at two predetermined locations along the lengthwise direction, approximately at a middle portion in the widthwise direction. Stanchions 154 are inserted through the respective through holes 152. Each of the stanchions 154 is composed of a rectangular block-type base section 154A and a pillar-shaped supporting section 154B which stands on an upper surface of the base section 154A.

As shown in FIG. 5, a plurality of groove sections 90 are formed in the peripheral surface of the rotary drum 54 with predetermined intervals. The rear end chuck 74 is attached to the rotary drum 54 such that the base sections 154A of the stanchions 154 are housed in the groove sections 90. In this housed state, the stanchions 154 are pivotable orthogonally to the drum axial direction about a contact point of the attachment groove 90 and the stanchion 154.

When the stanchion 154 is inserted into the groove section 90, a narrow side thereof corresponds to a widthwise direction of the groove section 90, so that insertion is possible. The stanchion 154 is then rotated through approximately 90° so as to be prevented from slipping out.

In the case of the front end chuck 62, the same structure as the rear end chuck 74 is not necessarily required. For example, the front end chuck 62 may have a structure that is fixed by bolts.

Figure 8:
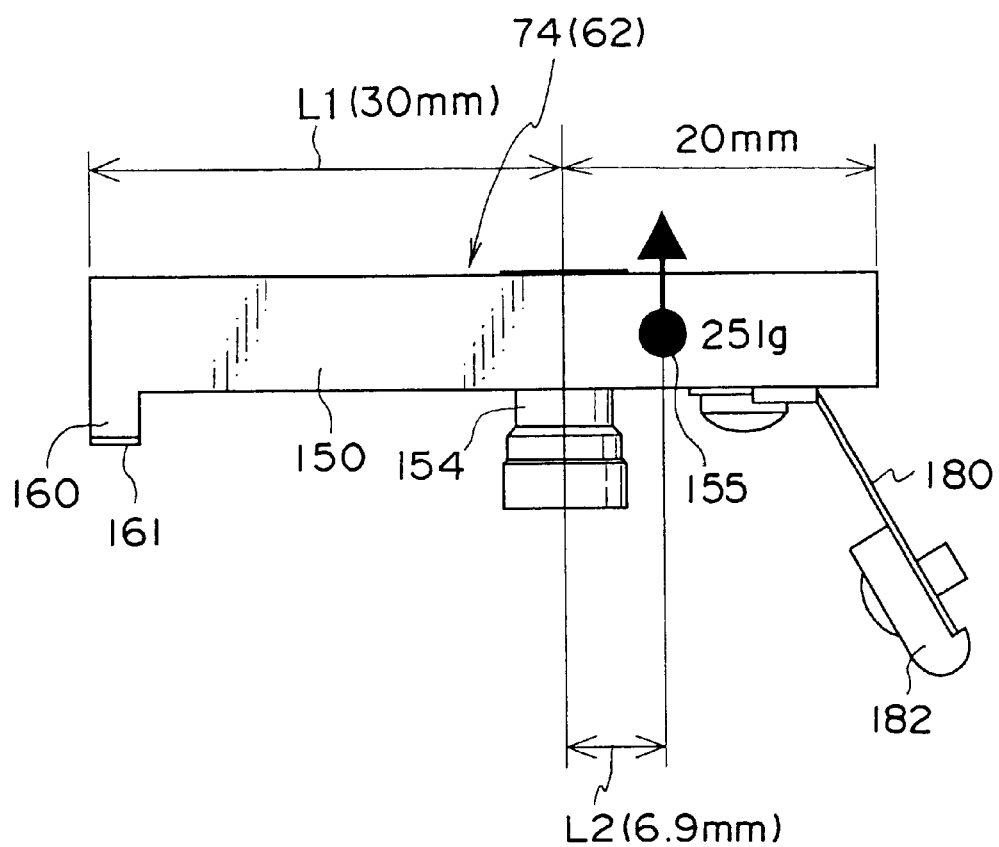
FIG. 8 is a side view showing a chuck according to the first embodiment.

In a state in which all parts are mounted to the plate 150, its center of gravity (shown as a black circular portion 155 in FIG. 8) is on the right side in FIG. 8 of the axis of the stanchion 154.

A clamp section 160 is formed on one end in a widthwise direction of the plate 150 of the rear end chuck 74 (the left end portion in FIG. 8). The clamp section 160 is bent with respect to the plate 150 to approximately a right angle to a direction of the rotary drum 54, and a rubber sheet 161 is stuck to its distal end surface. The rubber sheet 161 directly contacts the printing plate 12 and is an important element which determines a coefficient of friction when the printing plate 12 is nipped by the clamp section 160 and the peripheral surface of the rotary drum 54. That is, the rubber sheet 161 determines a coefficient of friction $\mu_1$ between the clamp section 160 and the printing plate 12 (in this embodiment, $\mu_1 = 1.0$). A coefficient of friction $\mu_2$ between the printing plate 12 and the rotary drum 54 is determined by their respective materials and the like (in this embodiment, $\mu_2 = 0.5$).

One end of a plate spring 180 which is bent into an approximate circumflex accent shape is fixed to a lower surface on the right end portion in FIG. 8 of the plate 150. The bending direction of the plate spring 180 faces a direction which approaches the rotary drum 54, and a weight 182 is attached to another end portion of the plate spring 180. A distal end surface of the weight 182 is a rounded surface.

During attachment to the rotary drum 54, the plate spring 180 and the weight 182 are housed in the groove sections 90 provided in the rotary drum 54. Specifically, when the rear end chuck 74 approaches the rotary drum 54, first the weight 182 abuts against a bottom surface of the groove section 90, and as the rear end chuck 74 further approaches the rotary drum 54, the plate spring 180 is elastically (resiliently) deformed. An applying force generated due to this elastic deformation becomes a force which causes the plate 150 to pivot on the stanchion 154, and as a result a pressing force at the clamp section 160 is generated. When the plate spring is elastically deformed, the weight 182, slides on the bottom surface of the groove section 90. Because the sliding surface is a rounded surface, a coefficient of comparative friction is small, and the weight 182, can slide smoothly.

The rear end chuck 74 (and/or front end chuck 62) having the above structure has the dimensions shown in Table 1 following. Table 1 also shows the thicknesswise dimension t and density c of the printing plate 12 the radius r of the rotary drum, and the coefficients of friction $\mu_1$ and $\mu_2$.

TABLE 1

| Item | Symbol | Numerical value |
| --- | --- | --- |
| Chuck weight | m | 0.251 [kg] (chuck width: 300 mm) |
| Distance from fulcrum to clamp section (first arm) | $L_1$ | 30 x $10^{-3}$ [m] |
| Distance from fulcrum to rear end | | 20 x $10^{-3}$ [m] |
| Distance from fulcrum to center of gravity (second arm) | $L_2$ | 6.9 x $10^{-3}$ [m] |
| Coefficient of friction between clamp section and printing plate | $\mu_1$ | 1.0 |
| Coefficient of friction between printing plate and peripheral surface of rotary drum | $\mu_2$ | 0.5 |
| Radius of rotary drum | r | 0.165 [m] |
| Density of printing plate | c | 2.7 x $10^3$ [kg/m$^3$] |
| Thicknesswise dimension of printing plate | t | 0.3 x $10^{-3}$ [m] |

Investigation is now conducted as to whether or not the numerical values listed in Table 1 satisfy the following expression relating to the present invention.

$$\{(\mu_1+\mu_2)\times(L_2/L_1)\times m\} > c\times r\times t$$

Left hand side=$(1.0+0.5)\times(30/6.9)\times 0.251 \approx 1.637$
Right hand side=$2.7\times 10^3 \times 0.165 \times 0.3 \times 10^{-3} \approx 0.134$ Namely, left hand side>right hand side holds.

This means that the dimensions of the components in the present embodiment were set suitably, and that the printing plate can be fixed by the rear end chuck satisfactorily.

There will now be explained operation of the present embodiment.

In the image exposure apparatus 10, when image data to be exposed on the printing plate 12 is input, a size and a number of the printing plates 12 to be subjected to image exposure are set, commencement of image exposure is instructed, and the image exposure process on the printing plate 12 is started. This process may be a process in which the instruction is given by operations via switches on an operation panel provided to the image exposure apparatus 10, or may be a process in which processing by the image exposure apparatus 10 is instructed to be started by a signal from an image processing apparatus or the like that outputs the image data to the image exposure apparatus 10.

In the image exposure apparatus 10, when the starting of the process is instructed, the sheet unit 30 and the inversion unit 28 are moved to a position corresponding to the cassette 16 housing the printing plates 12 having the specified size, and the printing plate 12 in the corresponding cassette 16 is sucked and taken out by the suction pads 38, and sent to between the inversion roller 32 and the conveying belt 36 of the inversion unit 28. As a result, the printing plate 12 is nipped between the inversion roller 32 and the conveying belt 36, and conveyed out to the transport conveyor 42.

The transport conveyor 42 first inserts the front end of the printing plate 12 into the notching opening 60 of the puncher 58. The puncher 58 forms the notch for location at the predetermined position of the inserted printing plate 12. When the notch has been formed on the printing plate 12 the transport conveyor 42 pulls the printing plate 12 out of the notching opening 60 of the puncher 58 and sends the printing plate 12 towards the peripheral surface of the rotary drum 54.

In the recording section 22, when the front end of the printing plate 12 has been held to the rotary drum 54 by the front end chuck 62, the printing plate 12 is squeezed by the squeeze roller 66 and at the same time wound around the rotary drum 54, and then the rear end of the printing plate 12 is held to the rotary drum 54 by the rear end chuck 74. This holding sequence will be described later.

Thereafter, in the recording section 22, while the rotary drum 54 is being rotated at high speed, the light beam based on the image data is emitted from the recording head section 56 to the printing plate 12 so that the printing plate 12 is scanned and exposed. During this high-speed rotation, a force for nipping the printing plate 12 acts at the front end chuck 62 and the rear end chuck 74 by the effect of centrifugal force due to the rotation of the rotary drum 54.

When the scanning and exposure of the printing plate 12 are ended, the front end chuck 62 is detached, and the printing plate 12 is sent out to the discharge buffer section 24.

In the discharge buffer section 24, the printing plate 12 is nipped and conveyed by the small roller 80A and the roller 84 and is wound around the discharge roller 78. Thereafter, the small roller 80A and the roller 84 are caused to face the discharge opening 76, and the printing plate 12 is sent out of the discharge opening 76 at the predetermined conveying speed.

There will now be explained a sequence of nipping and stretching the printing plate 12 on the rotary drum 54 by means of the front end chuck 62 and the rear end chuck 74, and of maintenance.

(Attachment/Detachment of Rear End Chuck 74)

Firstly, when the rear end chuck 74 is attached to the rotary drum 54, short sides of the base sections 154A are made to correspond to an opening widthwise direction of the groove section 90, and the base section 154A of the stanchion 154 is housed in the groove section 90 of the rotary drum 54. As a result, the base section 154A is housed in the groove section 90 smoothly. After this housing, the whole stanchion 154 is rotated through approximately 90°, and the long sides of the base section 154A are set along the opening widthwise direction of the groove section 90 so that slipping-out is prevented.

In order to detach the rear end chuck 74 from the rotary drum 54, the base section 154A can be rotated through another approximately 90° and pulled out.

(Nipping (Clamping) of the Printing Plate 12)

When the end of the printing plate 12 comes between the rotary drum 54 and the plate 150, rotation prevention of the front end chuck 62 by the cam 64 is released and the plate 150 is pivoted on the stanchion by an applying force of the plate spring 180. Because the clamp section 160 is moved toward the peripheral surface of the rotary drum 54 by this pivoting, the printing plate 12 can be nipped by the clamp section 160 and the peripheral surface of the rotary drum 54.

When the printing plate 12 comes to another predetermined position, the rear end chuck 74 is attached to the rotary drum 54, and an applying force of the plate spring 180 acts on the rear end chuck 74 according to the movement/attachment (first the weight 182 at the distal end of the plate spring 180 reaches the bottom surface of the groove section 90). The plate 150 is caused to gradually pivot on the stanchion 154, and the located printing plate 12 can be nipped between the rear end chuck 74 and the peripheral surface of the rotary drum 54.

When the holding of the printing plate 12 by the front end chuck 62 and the rear end chuck 74 is prepared, the rotary drum 54 starts to rotate at high speed in order to record an image.

As a result of this rotation, the plate 150 is pivoted on the stanchion by centrifugal force. At this time, because the center of gravity of the plate 150 is at an opposite side of the stanchion 154 to the side thereof at which the clamp section 160 is disposed, the plate 150 is pivoted by the centrifugal force in the same direction as the pivoting due to the applying force of the plate spring 180. Hence, while the rotary drum is being rotated at high speed, namely, while an image is being recorded, the nipping force of the front and rear ends of the printing plate 12 can be increased.

For the centrifugal force due to the high-speed rotation of the rotary drum 54, the distance $L_1$ from the stanchion 154 of the front end chuck 62 or rear end chuck 74 to the clamp section 160, the distance $L_2$ from the stanchion 154 to the center of gravity 155, and the position of the center of gravity 155 are important elements. However, the centrifugal force cannot be maximally utilized by considering only these elements. Therefore, in the present embodiment, in addition to the above elements, weight of the front end chuck 62 or rear end chuck 74, the thicknesswise dimension t and the density c of the printing plate 12 the coefficient of friction $\mu_1$ between the printing plate 12 and the clamp section 160 (rubber sheet 161), and the coefficient of friction $\mu_2$ between the printing plate 12 and the rotary drum 54 are taken into consideration. Thus, the front end chuck 62 and the rear end chuck 74 can be obtained with optimal shapes and structures which could not be achieved by the prior art.

Namely, the front end chuck 62 and the rear end chuck 74 are structured according to the numerical values shown in Table 1, and these numerical values are set so that the following expression relating to the present invention holds.

$$\{(\mu_1+\mu_2)\times(L_1/L_2)\times m\} > c \times r \times t$$

When the numerical values in Table 1 are substituted into this expression, the left hand side is 0.251, and the right hand side is about 0.134.

As a result, (left hand side)>(right hand side) holds, and the holding due to the centrifugal force can be maximally obtained.

In a structure explained in the prior art, a ratio of the lengths from the fulcrum of a seesaw-type arm to ends thereof is defined, and a strong holding force is applied at a front end portion of an arm on a clamp section side. However, it is clear that the structure of the present embodiment does not correspond to the structure in the prior art with respect to the lengths of the arms (in the present embodiment, the length from the stanchion 154 to the clamp section 160 is the longer length).

That is, the position of the center of gravity in the holding apparatus, the coefficient of friction between the holding apparatus and the sheet material at the time of holding the sheet material, the coefficient of friction between the sheet material and the rotary drum, and the like are taken into consideration so that the most suitable structure can be obtained.

As explained above, the present invention produces an excellent effect in that when the sheet member is wound around the rotary body and the ends of the sheet member in the winding direction are held, the centrifugal force generated by the rotation of the rotary body is utilized efficiently so as to be capable of holding the end securely and preventing looseness of the sheet member and the like.

There will now be explained a second embodiment of the present invention. The same reference numerals are given to components which are substantially the same as in the first embodiment, and overlapping explanations are omitted where suitable.

The plate 150 of the rear end chuck 74 is formed with through holes 152 respectively at three predetermined locations along the longitudinal direction, approximately at a middle portion of the widthwise direction, and the stanchions 154 are inserted respectively thereinto. The each stanchion 154 is composed of the rectangular block-shaped base section 154A (detailed below), and the columned supporting section 154B which stands on the upper surface of the base section 154A. A cylindrical spacer 156 is pushed onto a root end of the supporting section 154B so that the plate 150 can be supported at a predetermined height from the base section 154A.

The plurality of groove sections 90 is formed in the peripheral surface of the rotary drum 54 at predetermined intervals, and the rear end chuck 74 is attached to the rotary drum 54 in the state in which the base section 154A of the stanchion 154 is housed in the groove section 90. In this housed state, the stanchions 154 are pivotable orthogonally to the drum axial direction about a contact point between the attachment groove 90 and the stanchion 154.

Figure 11:
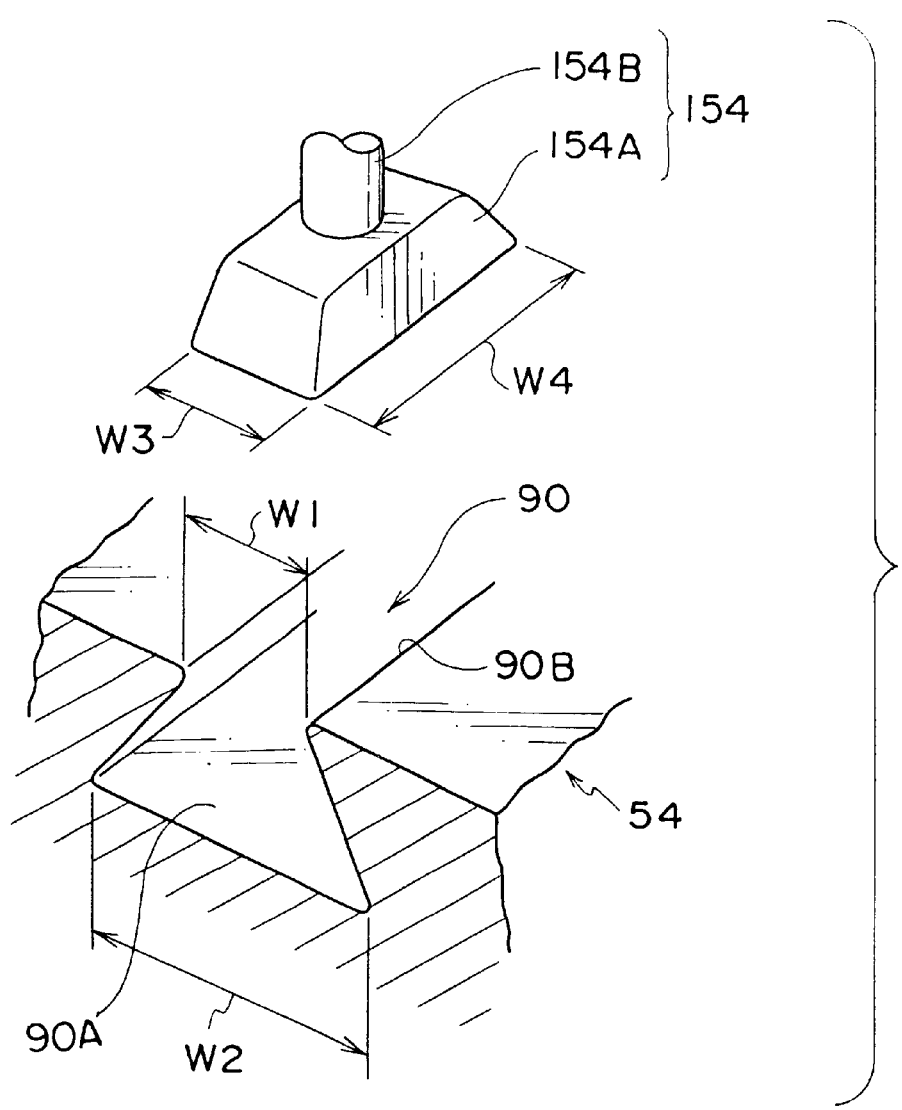
FIG. 11 is a perspective view showing a relationship between a chuck stanchion and a drum groove according to the second embodiment.

As shown in FIG. 11, a sectional shape of the groove section 90 is substantially trapezoid, and a widthwise dimension W1 of an opening side is smaller than a widthwise direction W2 of a bottom portion. The portion of the stanchion 154 to be housed in the groove section 90 has a rectangular shape, and a dimension W3 of each of a pair of opposite sides thereof is smaller than the widthwise dimension W1 of an opening portion 90B of the groove section 90. A dimension W4 of the other pair of opposite sides is smaller than the widthwise dimension W2 of a base portion 90A of the groove section 90 and larger than the widthwise dimension W1 of the opening portion 90B. Hence, when the stanchion 154 is inserted into the groove section 90, the short sides are aligned along the widthwise direction of the groove section 90 so that the stanchion 154 can be inserted. After the insertion, the stanchion 154 is rotated through about 90° so that slipping-out can be prevented.

Because the front end chuck 62 does not require attachment and detachment, the above structure is not necessary. Thus, for example, the front end chuck 62 may be fixed via bolts. However, the above structure may be applied but with the front end chuck 62 always in the fixed state.

Figure 12:
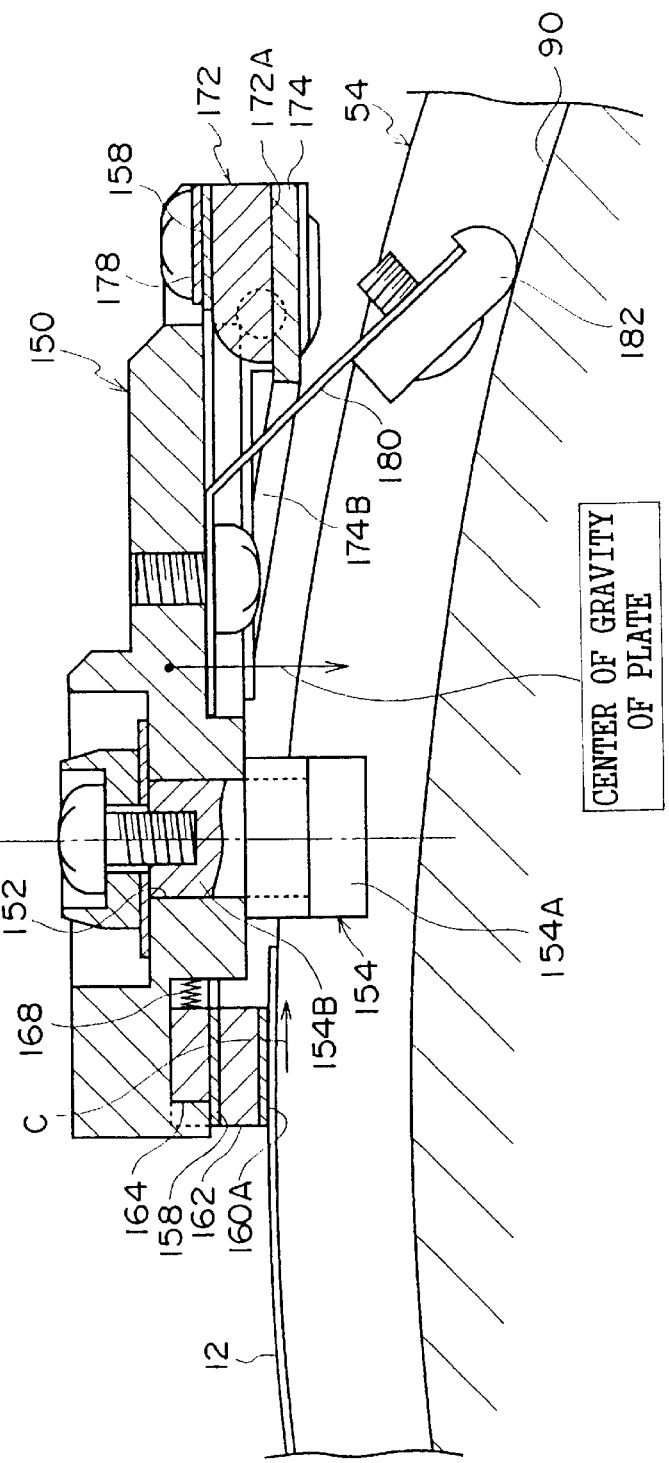
FIG. 12 is a sectional view showing the chuck according to the second embodiment in the groove position.
Figure 13:
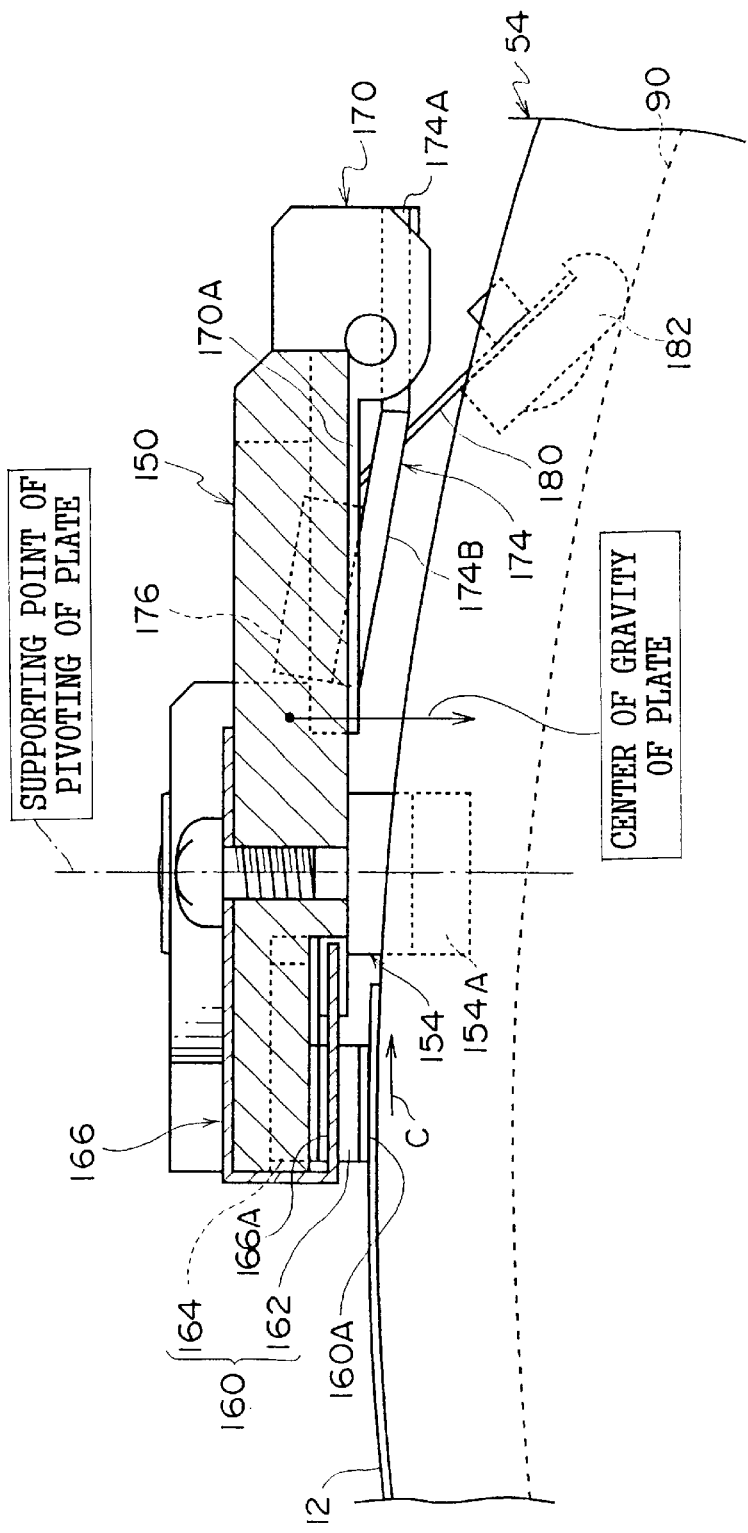
FIG. 13 is a sectional view showing the chuck according to the second embodiment.

When all parts are attached to the plate 150, the position of the center of gravity is on the right side in FIGS. 12 and 13 of the axis of the stanchion 154.

The clamp section 160 is formed on one end portion of the plate 150 of the rear end chuck 74 in the widthwise direction. The clamp section 160 is composed of at least a thin plate bar-type nipping member 162 with a rubber sheet 160A stuck to a flat surface thereof and facing the rotary drum 54, and a thin plate bar-type auxiliary member 164 which nips and fixes a metal plate 158, described later, with the nipping member 162.

The rubber sheet 160A directly contacts the printing plate 12, and is an important element which determines a coefficient of maximum rest friction during nipping of the printing plate 12 by the clamp section 160 and the peripheral surface of the rotary drum 54. That is, the rubber sheet 160A determines the coefficient of maximum rest friction $\mu_1$ between the clamp section 160 and the printing plate 12 (in the present embodiment, $\mu_1=1.0$). The coefficient of maximum rest friction $\mu_2$ between the printing plate 12 and the rotary drum 54 is determined by materials thereof and the like (in the present embodiment, $\mu_2=0.5$).

In addition, one end of the plate spring 180, which is bent into an approximate circumflex accent shape is fixed to the lower surface on the right end portion in FIG. 12 of the plate 150. The bending direction of the plate spring 180 faces towards the rotary drum 54. The weight 182 is attached to the other end portion. The distal end surface of the weight 182 is a rounded surface.

When the plate spring 180 and the weight 182 are attached to the rotary drum 54, they are housed in the groove section 90 provided in the rotary drum 54. Specifically, when the rear end chuck 74 approaches the rotary drum 54, first the weight 182 abuts against the bottom surface of the groove section 90 and, as the chuck approaches more closely, the plate spring 180 is elastically deformed. An applying force generated by the elastic deformation becomes a force causing the plate 150 to pivot on the stanchion 154 (pressure force $T_0$), and as a result pressing force is generated at the clamp section 160. The weight 182 slides on the bottom surface of the groove section 90 at the time of the elastic deformation of the plate spring. Because the sliding surface is a rounded surface, the coefficient of maximum rest friction is comparatively small, and the weight 182 can be slid smoothly.

Figure 14:
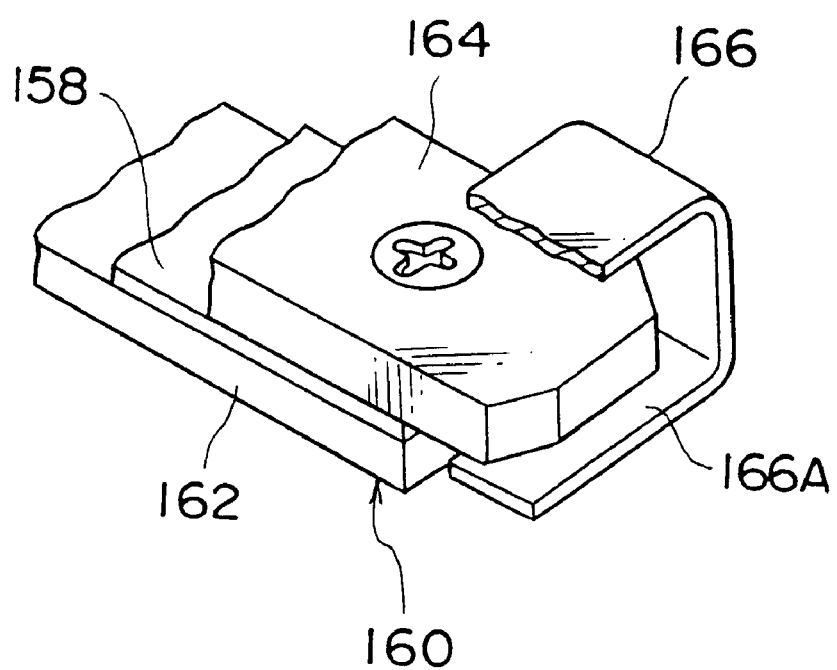
FIG. 14 is a perspective view showing main elements of a clamp section according to the second embodiment.

The clamp section 160 can move in the thicknesswise direction of the plate 150 (hereinafter, "up-and-down direction"), and three of the clamp section 160 are provided arranged in the longitudinal direction for one plate 150. As shown in FIG. 14, at both end portions in the longitudinal direction of the clamp section 160 (the axial direction of the rotary drum 54), the auxiliary member 164 is formed to be longer than the nipping member 162 such that a flap piece 164A is formed. The flap piece 164A is supported by a hook section 166A of a supporting plate 166, which is attached to both the ends and the center in the longitudinal direction of the plate 150. The hook section 166A is bent into an approximate U shape, and the flap piece 164A is housed at an inner side thereof. As a result, a moving amount of the clamp section 160 in the up-and-down direction is limited by upper and lower walls of the hook section 166A, and the clamp section 160 is prevented from slipping off by the lower wall.

In addition, the clamp section 160 is guided by a guiding groove (not shown) formed in the plate 150 and is movable by a predetermined amount in the widthwise direction of the plate 150 (hereinafter, "sliding direction").

Figure 9:
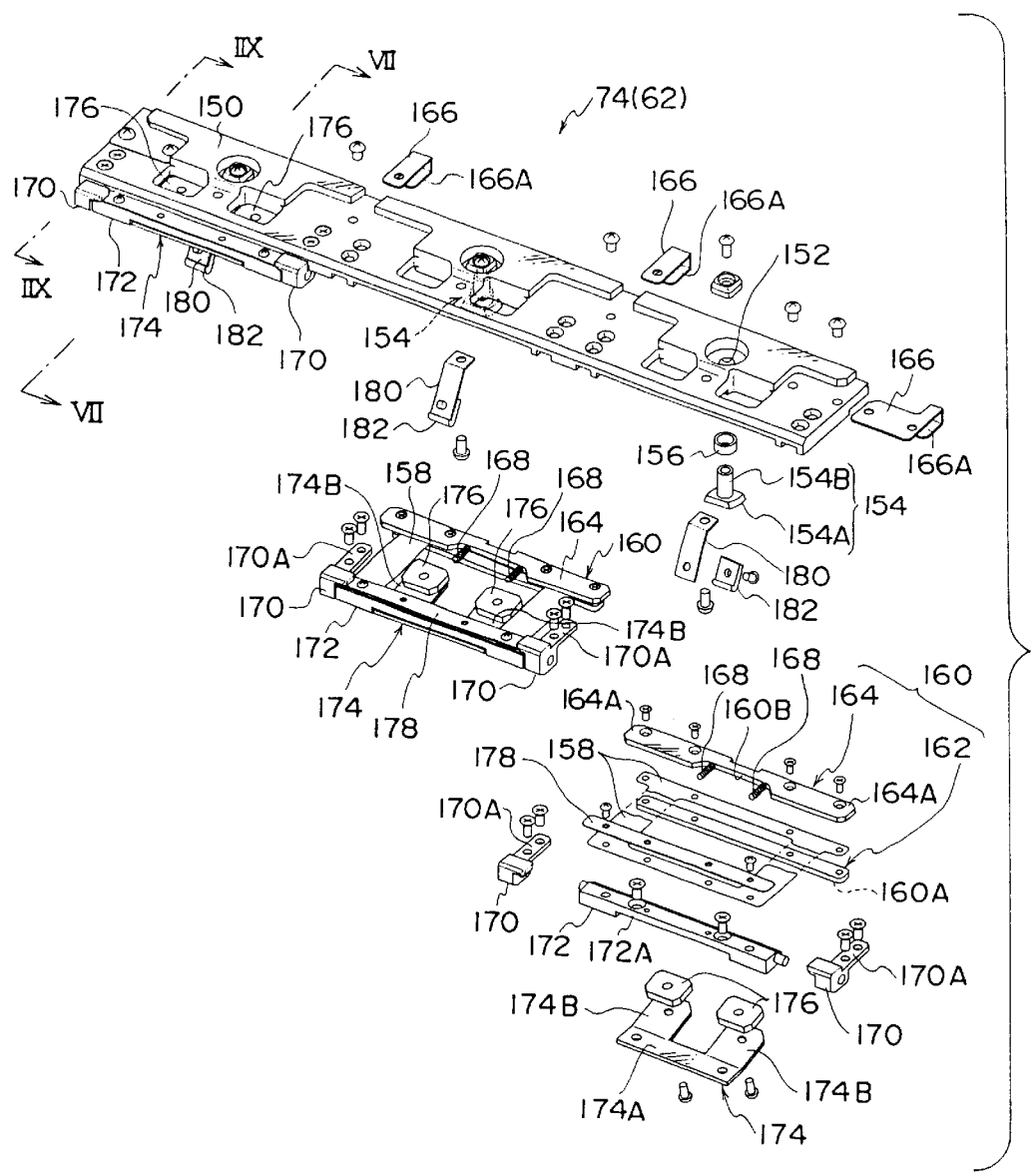
FIG. 9 is an exploded perspective view showing the chuck according to a second embodiment.
Figure 10:
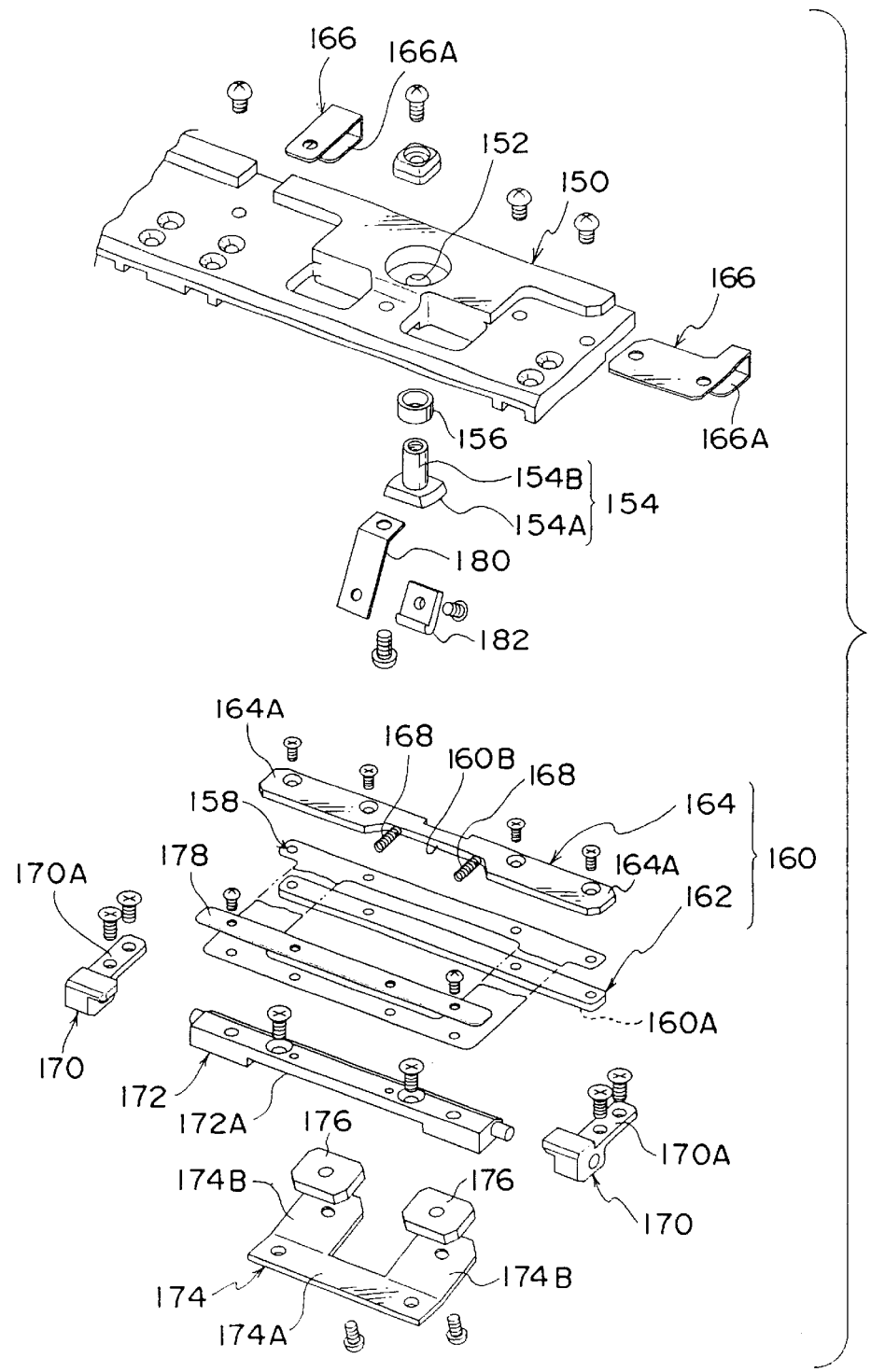
FIG. 10 is an exploded perspective view showing an enlarged part of FIG. 9.

One end of each of compression coil springs 168 is abutted against the right surface in FIGS. 12 and 13 of each clamp section 160 (a side surface in which a notch 160B is formed as in FIGS. 9 and 10). The other end of the compression coil spring 168 is inserted and held in a circular groove (not shown) provided in a wall surface at the inside of the plate 150. As a result, the clamp section 160 is pressed and held to an end of the sliding range in a direction from which the printing plate 12 is inserted by the applying force of the compression coil spring 168 (hereinafter, this position is referred to as "original position").

In addition, as mentioned above, one end of the metal plate 158, which has thin thickness and flexibility, is nipped between the nipping member 162 and auxiliary member 164 composing the clamp section 160.

The metal plate 158 has a frame shape in plan view, two sides of which intersect perpendicularly to the nipped side and extend toward the right end portion in FIGS. 12 and 13 of the plate 150. The metal plate 158 does not have this frame shape for functional reasons but for preventing interference with other parts. Therefore, the metal plate 158 may have a flat plate shape, providing such interference does not occur.

A bar-type rotary member 172 having an approximately square section is attached to the right end portion in FIGS. 12 and 13 of the plate 150 via a supporting body 170. The rotary member 172 is axially supported by the rectangular block-shaped supporting body 170, which has an approximately square section, and is rotatable with respect to the supporting body 170. An attachment flange 170A is formed integrally with the supporting body 170, and is fixed to the plate 150.

A flap 174 is attached to the rotary member 172 and one end of the flap 174 is housed in a notch 172A formed in a lower surface of the rotary member 172. In the flap 174, a pair of blades 174B extend from a base section 174A housed in the notch 172A toward the clamp section 160, and weights 176 are fixed to distal ends of the blades 174B. In this structure, when the rear end chuck 74 is fixed to the rotary drum 54 and rotated, centrifugal force is applied to the flap 174, the centrifugal force functions effectively at the weights 176, and is capable of rotating the rotary member 172.

The other end of the metal plate 158 is arranged on an upper surface of the rotary member 172 and is nipped and fixed by the upper end surface and a thin plate bar-type fixing member 178.

Consequently, a stretching force (tensioning force) is applied to the metal plate 158 by the rotation of the rotary member 172. The rotating force of the rotary member 172 is converted into the tensioning force by deflection of the metal plate 150, that is, winding of the metal plate 158 around the rotary member 172. Because moving force is slight, the metal plate 158 virtually moves almost horizontally.

The tensioning force at the metal plate 158 can move the clamp section 160 from the original position rightwards in FIGS. 12 and 13 (direction of arrow C), against the applying force of the compression coil springs 168.

In the rear end chuck 74 (front end chuck 62) having the above structure, the following relational expression including the variables shown in Table 2 holds.

TABLE 2

| Item | Symbol |
|---|---|
| Weight of holding apparatus | m |
| Distance from fulcrum to clamp section (first arm) | $L_1$ |
| Distance from fulcrum to point of application of pressure force | $L_3$ |
| Distance from fulcrum to center of gravity (second arm) | $L_2$ |
| Coefficient of maximum rest friction between clamp section and | $\mu_1$ |

TABLE 2-continued

| Item | Symbol |
|---|---|
| printing plate | |
| Coefficient of maximum rest friction between printing plate and peripheral surface of rotary drum | $\mu_2$ |
| Radius of rotary drum | r |
| Density of printing plate | c |
| Thicknesswise dimension of printing plate | t |
| Distance from center of rotary drum to center of gravity | $\alpha r$ |
| Pressure force | $T_0$ |

$$\mu_1[(L_2/L_1)m\alpha r\omega^2+(L_3/L_1)T_0]>F>cr^2t\omega^2+\mu_2[(L_2/L_1)m\alpha r\omega^2+(L_3/L_1)T_0]$$

F, the tensioning force, is set such that the above expression holds. As a result, when the rotary drum 54 rotates so that the centrifugal force acts, the printing plate 12 is nipped and held between the rear end chuck 74 and front end chuck 62 of the present embodiment and the rotary drum 54. At this time, the centrifugal force is also utilized such that the rear end chuck 74 and the front end chuck 62 respectively stretch the printing plate 12 in a stretching direction.

Figure 15:
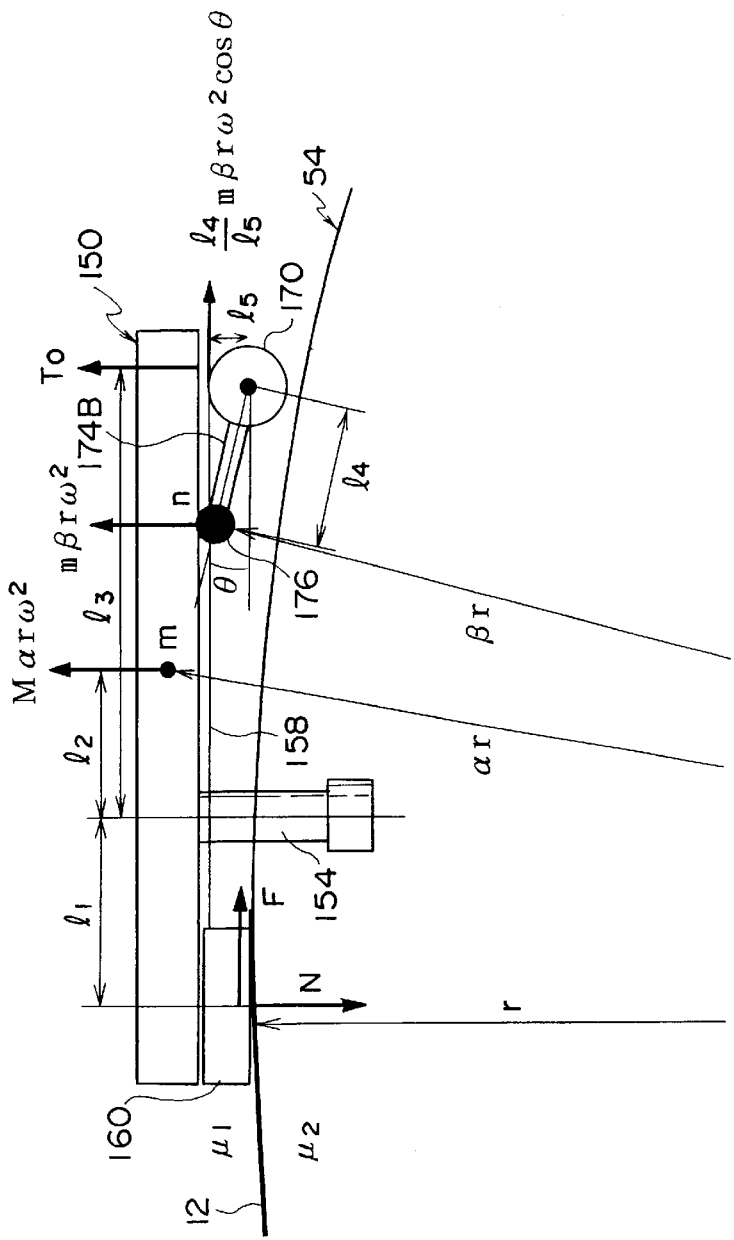
FIG. 15 is an abstract diagram modelling front end and rear end chucks according to the second embodiment.

The rear end chuck 74 (and/or front end chuck 62) having the above structure according to the present embodiment, if shown by a schematic diagram as in the SUMMARY OF THE INVENTION, is as shown in FIG. 15.

As shown in FIG. 15, of force generated by the rotation of the supporting body 170, a portion corresponding to the tensioning force F can be converted into the force stretching the metal plate 158. Specifically, if lengthwise dimension of the flap 174 in a radial direction from the rotary axis of the supporting body 170 is $L_4$, weight of the weights 176 provided at the distal ends of the flap 174 is n, tilt angle of the flap 174 with respect to a horizontal line of the plate 150 is $\theta$, distance from the center of the rotary drum 54 to the weights 176 is $\beta r$, and vertical distance between the weights 176 and the rotary axis of the supporting body 170 is $L_5$, then the tensioning force F can be represented by the following expression.

$$F=(L_4/L_5)n\beta r\omega^2 \cos \theta$$

In this expression, if $\cos \theta \approx 1$ and $(L_4/L_5)n\beta$ is replaced by a coefficient k, the tensioning force F is converted to the following equation.

$$F=kr\omega^2$$

There will now be explained operation of the present embodiment. However, descriptions which overlap with those of the first embodiment are omitted, and only particular sections will be detailed.

(Stretching of the Printing Plate 12)

The centrifugal force due to the high-speed rotation of the rotary drum 54 acts on the flap 174. Because the weights 176 are attached to the blades 174B of the flap 174, a moment of axial rotation of the blades 174B due to the centrifugal force is large, and this force rotates the rotary member 172. Because the flap 174 is attached to the lower surface of the rotary member 172, the rotary member 172 rotates in a clockwise direction of FIGS. 12 and 13. When the rotary member 172 rotates in the clockwise direction of FIGS. 12 and 13, the metal plate 158 attached to the upper end of the rotary member 172 moves so as to wind around the rotary member 172. As a result, force in the stretching direction (tensioning direction) acts upon the metal plate 158.

Movement of the metal plate 158 in the tensioning direction becomes a force for sliding the clamp section 160 from the original position against the applying force of the compression coil springs 168.

When the clamp section 160 slides from the original position, the printing plate 12 nipped with the rotary drum 54 stretches in the stretching direction. Here, because contact of the clamp section 160 with the printing plate 12 is a surface contact, the coefficient of maximum rest friction is large and the printing plate 12 can be stretched securely.

Because this effect is generated at both front and rear ends of the printing plate 12, a middle portion of the printing plate 12 does not lift from the peripheral surface of the rotary drum 54.

When such lifting occurs, the printing plate 12 shifts from a focal position of a laser beam recording an image onto the surface. However, in this embodiment, the front and rear ends of the printing plate 12 are nipped between the clamp sections 160 and the rotary drum 54 (a force caused by the plate spring 180 and the centrifugal force applied to the plate 150) and the printing plate 12 is stretched (because of the centrifugal force acting on the flap 174). Thus, the middle portion of the printing plate 12 does not lift, and deterioration of image quality can be prevented.

The force F (tensioning force F) for moving the printing plate 12 in the stretching direction greatly influences a degree to which the coefficient of maximum rest friction $\mu_1$ between the clamp section 160 and the printing plate 12 and the coefficient of maximum rest friction $\mu_2$ between the printing plate 12 and the rotary drum 54 prevent lifting of the middle portion of the printing plate 12. Setting of the effective tensioning force F also relates to the parameters shown in Table 2 as well as the coefficients of maximum rest friction $\mu_1$ and $\mu_2$.

When the tensioning force F is determined such that the following relational expression holds, a tensioning force F such that sliding does not occur between the clamp section 160 and the printing plate 12, but sliding can occur between the printing plate 12 and the rotary drum 54, can be obtained.

$$\mu_1[(L_2/L_1)m\alpha r\omega^2+(L_3/L_1)T_0]>F>cr^2t\omega^2+\mu_2[(L_2/L_1)m\alpha r\omega^2+(L_3/L_1)T_0]$$

Further, in order to provide a degree of freedom in design, it is preferable that limitations on the coefficients of maximum rest friction $\mu_1$ and $\mu_2$ and the items described in Table 1 are avoided.

Therefore, the rotation of the supporting body 170 can be converted into a force for stretching the metal plate 158, which is the force corresponding to the tensioning force F.

That is, as described above, the tensioning force F can be represented by the following expression.

$$F=(L_4/L_5)n\beta r\omega^2 \cos \theta$$

And if $\cos \theta \approx 1$ and $(L_4/L_5)n\beta$ is replaced by the coefficient k, then:

$$F=kr\omega^2$$

Accordingly, the length of the blade 174B corresponding to the coefficient k can be an adjustment element, and thus a degree of freedom of design can be increased. If necessary, the position of the center of gravity may be moved. If the position of the center of gravity is changed, $L_2$ can be changed. The position of the center of gravity can be moved by a simple operation such as attaching a balancer or the like.

As explained above, in the present embodiment, because the contact of the clamp section 160 of the plate 150 with the printing plate 12 is surface contact, holding force of the printing plate 12 can be strengthened. Moreover, as a mechanism for applying stretching force to the printing plate 12, in addition to the mechanism for holding the printing plate 12 by means of the clamp section 160, the clamp section 160 is slid by utilizing the impulse due to the centrifugal force of the flap. For this reason, tilt of the plate 150 due to pivoting thereof is decreased, and an amount of projection thereof from the rotary drum 54 can be reduced.

Further, because the clamp section 160 is arranged at a distal end of one end of the plate 150 in the widthwise direction, a bite allowance of the printing plate 12 is short, and an image recordable area can be large.

In addition, because the mechanism for nipping (holding) the printing plate 12 between the plate 150 (clamp section 160) and the rotary drum 54, and the mechanism for stretching the printing plate 12 by means of sliding of the clamp section 160 can be designed independently, optimal design is easy.

In the present embodiment, in the procedure for winding and holding the printing plate 12 around the rotary drum 54, the front end chuck 62 is fixed and the rear end chuck 74 is detachable. However, both may be detachable or fixed, or the front end chuck 62 detachable and the rear end chuck 74 fixed, according to the winding procedure. Moreover, the position of a fixed chuck is not limited.

In addition, in the present embodiment, centrifugal force is converted into rotating force of the supporting body 170, and the metal plate 158 is pulled by the rotation so that the tensioning force F is applied to the clamp section 160. However, a cam mechanism in which holding force is diverted at the clamp section 160, or a mechanism using a plate spring or the like may be adopted. That is, a guide mechanism which moves the clamp section 160 in a direction that is slanted with respect to the radial direction of the rotary body 54 may be provided such that the tensioning force F is obtained. In such a case, because the holding force is diverted, the degree of freedom of design is narrower than in the present embodiment, but the structure can be simpler.

What is claimed is:

1. A holding apparatus for a sheet member which has a density c and a thickness t, the apparatus comprising:
   (a) a rotary body having a radius r and an outer peripheral surface around which the sheet member can be wound, a coefficient of friction between the sheet member and the outer peripheral surface being $\mu_2$;
   (b) a support attached to the outer peripheral surface of said rotary body; and
   (c) an arm comprising two end portions and an arm portion supported by said support between said two end portions, said arm having a weight m per unit length in an axial direction of said rotary body, said arm being pivotable about a fulcrum at said arm portion, said arm having a clamp section provided at one of said end portions at a distance $L_1$ from the fulcrum for applying pressure to the sheet member, which is disposed between said one end portion and the outer peripheral surface of said rotary body, a coefficient of friction between said clamp section and the sheet member being $\mu_1$, and said arm having a center of gravity at a position between the other of said end portions and the fulcrum at a distance $L_2$ from the fulcrum, wherein the expression $(\mu_1+\mu_2)m(L_2/L_1)>crt$ is satisfied.

2. The holding apparatus according to claim 1, further comprising a resiliently deformable element connected to said other end portion of said arm, wherein, when said support is attached to said rotary body, said element is resiliently deformed such that force is applied to said other end portion of said arm, said one end portion of said arm is pivoted toward the outer peripheral surface of said rotary body, and pressure on the sheet member is generated.

3. The holding apparatus according to claim 1, wherein, when said rotary body is rotated, centrifugal force acting at said arm acts to increase the pressure on the sheet member.

4. The holding apparatus according to claim 1, wherein said rotary body includes at least one groove formed along the outer peripheral surface of said rotary body, and said support is attachable to and detachable from said rotary body via the groove.

5. The holding apparatus according to claim 4, wherein the groove has a base portion and an opening portion, the opening portion being formed at the outer peripheral surface of said rotary body, and has a substantially trapezoid section such that width of the opening portion is smaller than width of the base portion.

6. The holding apparatus according to claim 1, wherein said rotary body includes at least one groove formed along the outer peripheral surface of said rotary body, and said support is disposed at a desired position of the outer peripheral surface of said rotary body via the groove.

7. The holding apparatus according to claim 6, wherein the groove has a base portion and an opening portion, the opening portion being formed at the outer peripheral surface of said rotary body, and has a substantially trapezoid section such that width of the opening portion is smaller than width of the base portion.

* * * * *